United States Patent
Joshi et al.

(10) Patent No.: US 9,854,275 B2
(45) Date of Patent: Dec. 26, 2017

(54) QUANTIZATION IN VIDEO CODING

(75) Inventors: Rajan Laxman Joshi, San Diego, CA (US); Xianglin Wang, San Diego, CA (US); Geert Van der Auwera, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 670 days.

(21) Appl. No.: 13/531,106

(22) Filed: Jun. 22, 2012

(65) Prior Publication Data

US 2013/0051457 A1 Feb. 28, 2013

Related U.S. Application Data

(60) Provisional application No. 61/501,213, filed on Jun. 25, 2011, provisional application No. 61/502,751, (Continued)

(51) Int. Cl.
*H04N 7/26* (2006.01)
*H04N 19/90* (2014.01)
*H04N 19/147* (2014.01)
*H04N 19/172* (2014.01)
*H04N 19/46* (2014.01)
*H04N 19/61* (2014.01)
(Continued)

(52) U.S. Cl.
CPC ........... *H04N 19/90* (2014.11); *H04N 19/124* (2014.11); *H04N 19/126* (2014.11); *H04N 19/147* (2014.11); *H04N 19/172* (2014.11); *H04N 19/174* (2014.11); *H04N 19/46* (2014.11); *H04N 19/61* (2014.11)

(58) Field of Classification Search
None
See application file for complete search history.

(56) References Cited

U.S. PATENT DOCUMENTS 8,184,694 B2 * 5/2012 Srinivasan ............... 375/240.03
8,908,763 B2 12/2014 Raveendran
(Continued)

FOREIGN PATENT DOCUMENTS

EP 2317769 A1 5/2011
JP 2000333182 A 11/2000
(Continued)

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
(Continued)

*Primary Examiner* — Andy Rao
*Assistant Examiner* — Samuel D Fereja

(57) ABSTRACT

In an example, aspects of this disclosure relate to a method of coding video data that includes determining a quantization parameter (QP) for coding residual video data, where the QP is indexed to a quantizer step size. The method also includes determining a quantization scaling value for scaling the quantizer step size, and applying the quantization scaling value scaling to the quantizer step size. The method also includes coding the residual video data using the scaled quantizer step size.

38 Claims, 6 Drawing Sheets

Related U.S. Application Data filed on Jun. 29, 2011, provisional application No. 61/546,450, filed on Oct. 12, 2011, provisional application No. 61/546,723, filed on Oct. 13, 2011.

(51) Int. Cl.
*H04N 19/124* (2014.01)
*H04N 19/126* (2014.01)
*H04N 19/174* (2014.01)

(56) References Cited

U.S. PATENT DOCUMENTS

| | | |
|---|---|---|
| 2005/0190836 A1 | 9/2005 | Lu et al. |
| 2005/0201629 A1 | 9/2005 | Karczewicz et al. |
| 2006/0002467 A1* | 1/2006 | Haskell et al. ......... 375/240.03 |
| 2006/0133478 A1 | 6/2006 | Wen |
| 2007/0195879 A1 | 8/2007 | Jeon et al. |
| 2007/0258518 A1 | 11/2007 | Tu et al. |
| 2008/0240235 A1* | 10/2008 | Holcomb ............ H04N 19/176 375/240.03 |
| 2008/0240250 A1 | 10/2008 | Lin et al. |
| 2008/0304562 A1 | 12/2008 | Chang et al. |
| 2009/0067493 A1 | 3/2009 | Jun et al. |
| 2009/0147843 A1* | 6/2009 | Han et al. ................ 375/240.03 |
| 2009/0296808 A1 | 12/2009 | Regunathan et al. |
| 2010/0086028 A1 | 4/2010 | Tanizawa et al. |
| 2010/0290524 A1* | 11/2010 | Lu et al. .................. 375/240.03 |
| 2011/0109753 A1 | 5/2011 | Srinivasamurthy et al. |
| 2011/0122942 A1 | 5/2011 | Kudana et al. |
| 2011/0255594 A1* | 10/2011 | Nagori et al. .......... 375/240.03 |
| 2011/0268180 A1* | 11/2011 | Srinivasamurthy et al. ............ 375/240.03 |
| 2011/0274162 A1* | 11/2011 | Zhou et al. ............. 375/240.03 |
| 2012/0082219 A1* | 4/2012 | Sun .................... H04N 7/26058 375/240.12 |
| 2012/0114034 A1* | 5/2012 | Huang .................. H04N 19/70 375/240.03 |
| 2012/0201297 A1* | 8/2012 | Lim .................... H04N 19/126 375/240.03 |
| 2012/0219055 A1* | 8/2012 | He et al. ................. 375/240.03 |
| 2012/0287987 A1* | 11/2012 | Budagavi et al. ....... 375/240.02 |

FOREIGN PATENT DOCUMENTS

| | | | |
|---|---|---|---|
| JP | 2007522743 A | 8/2007 | |
| JP | 2010233274 A | 10/2010 | |
| KR | 20090115176 A | 11/2009 | |
| KR | 20100012149 A | 2/2010 | |
| KR | 20110022080 A | 3/2011 | |
| WO | 2005079073 A1 | 8/2005 | |
| WO | 2008132890 A1 | 11/2008 | |
| WO | 2009158428 | 12/2009 | |
| WO | WO 2011052217 A1 * | 5/2011 | ........... H04N 19/126 |

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

International Preliminary Report on Patentability from international application No. PCT/US2012/044031, dated Sep. 6, 2013, 14 pp.

International Search Report and Written Opinion of international application No. PCT/US2012/044031, dated Aug. 31, 2012, 18 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Richardson, "H.264 / MPEG-4 Part 10 White Paper, Transform and Quantization," www.vcodex.com, XP-002585108, Mar. 19, 2003, 9 pp.

Wiegand et al., "Draft ITU-T Recommendation and Final Draft International Standard of Joint Video Specification (ITU-T Rec. H.264, ISO/IEC 14496-10 AVC)," JVT Meeting; MPEG Meeting; (Joint Video Team of ISO/IEC JTC1/SC29/WG11 and ITU-T SG16 Q.6 ), Document JVT-G050r1, May 23-27, 2003, 269 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Hoang, "Finer scaling of quantization parameter," Zenverge, Inc., MPEG Meeting; Daegu; (Motion Picture Expert Group or ISO/IEC JTC1/SC29/WG11), Document JCTVC-D041, WG11 No. m18788, Jan. 20-28, 2011, 5 pp.

Second Written Opinion of international application No. PCT/US2012/044031, dated Jun. 6, 2013, 9 pp.

Reply to Written Opinion dated Aug. 31, 2012, from international application No. PCT/US2012/044031, dated Apr. 25, 2013, 32 pp.

Reply to Second Written Opinion dated Jun. 6, 2013, from international application No. PCT/US2012/044031, dated Aug. 6, 2013, 29 pp.

Office Action from corresponding European Patent Application Serial No. 12730772.6 dated Jul. 7, 2015 (9 pages).

Office Action from counterpart Japanese Application No. 2014-517252, dated Jan. 27, 2015, 14 pp.

Office Action from counterpart Korean Application No. 2014-7002132, dated Apr. 30, 2015, 9 pp.

Budagavi M., et.al., "JCT-VC AHG report: Quantization", [online], Mar. 15, 2011, Joint Collaborative Team on Video Coding (JCT-VC) of ITU-T SG16 WP3 and ISO/IEC JTC1/SC29/WG11, Document: JCTVC-E010 (version 1) (3 pages).

Kameyama W., et al., "Impress Standard Textbook Series—Digital Broadcasting Textbook for IPTV Era," 1st Edition, Apr. 1, 2010, Impress R&D, pp. 102-106, ISBN: 978-4-8443-2853-7 (16 pages) (partial translation summary of relevant portions).

McCann, et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.

Suzuki Y., "Recent Trend of MPEG-4 Visual," Report of the Information Processing Society of Japan (IPSJ), vol. 2004, No. 25 (2004-AVM-44), IPSJ, Mar. 5, 2004, pp. 85-90, ISSN: 0919-6072 (9 pages) (partial translation).

Japanese First Office Action from corresponding Japanese Application Serial No. 2014-517252 dated Aug. 18, 2015 including translation (13 pages).

Japanese Decision of Rejection from corresponding Japanese Application Serial No. 2014-517252 dated Dec. 22, 2015 (15 pages).

Office Action from corresponding Japanese Application Serial No. 2015-107814 dated Aug. 2, 2016 including translation (4 pages).

Okubo, et al., "H.264 / AVC Textbook", Impress R & D, Japan, Jan. 1, 2009, Revised 3rd Edition, pp. 140 to 142 and 268 to 274, ISBN: 978-4-8443-2664-9 including partial translation.

(56) References Cited

OTHER PUBLICATIONS

Tanisawa A., et al., "Video Coding with Adaptive Quantization Matrix Selection", Institute of Electronics, Information and Communication Engineers Journal, Japan, Institute of Electronics, Information and Communication Engineers, Nov. 1, 2008, vol. J91-D, No. 11, the second from 2647 to 2658 pages, ISSN: 1880-4535 including partial translation.

* cited by examiner

QUANTIZATION IN VIDEO CODING

This application claims priority to U.S. Provisional Patent Application No. 61/501,213, filed 25 Jun. 2011, U.S. Provisional Patent Application No. 61/502,751, filed 29 Jun. 2011, U.S. Provisional Patent Application No. 61/546,450, filed 12 Oct. 2011, and U.S. Provisional Patent Application No. 61/546,723, filed 13 Oct. 2011, the entire contents of each of which are hereby incorporated by reference in their entirety.

TECHNICAL FIELD

This disclosure relates to video coding techniques, and, more specifically, quantization in video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like.

Digital video devices may implement video compression techniques, such as those described in the standards defined by MPEG-2, MPEG-4, ITU-T H.263, ITU-T H.264/MPEG-4, Part 10, Advanced Video Coding (AVC), and extensions of such standards, to transmit and receive digital video information more efficiently. New video coding standards, such as the High Efficiency Video Coding (HEVC) standard being developed by the "Joint Collaborative—Team-Video Coding" (JCT-VC), which is a collaboration between MPEG and ITU-T, are being developed. The emerging HEVC standard is sometimes referred to as H.265, although such a designation has not formally been made.

SUMMARY

The techniques of this disclosure generally relate to video coding and quantization in video coding. For example, quantization (or inverse quantization) of transform coefficients may be performed during video coding according to a quantization parameter (QP). In some examples, QPs may be indexed to quantization step sizes that are applied during quantization (e.g., a higher step size results in greater quantization for a given QP). Certain techniques of this disclosure relate to applying a scaling factor to a quantizer step size associated with a QP. Applying such a scaling factor may provide greater control over an amount of quantization that is applied to transform coefficients during video coding. In addition, aspects of this disclosure relate to providing an indication, e.g., one or more syntax elements in an encoded bitstream, of the scaling factor that may be used to scale the quantizer step size, as well as decoding such an indication.

Other techniques of this disclosure generally relate to controlling a granularity with which quantization may be applied by a video coder. This disclosure generally refers to "quantization granularity" as an extent to which a predefined amount of quantization may be subdivided, or broken down into smaller parts. For example, a video coder may quantize transform coefficients using a range of QPs that are indexed to a range of quantizer step sizes from a minimum amount of quantization to a maximum amount of quantization. Accordingly, the QPs (and their associated quantizer step sizes) define the bounds of a total amount of quantization that may be applied to transform coefficients. In this example, quantization granularity may refer to the extent to which the total quantization is subdivided and indexed with QP values, which may then be applied to a transform coefficient during quantization.

Some aspects of this disclosure relate to adaptively changing the quantization granularity within a picture or slice. For example, aspects of this disclosure relate to selecting a quantization granularity for quantizing a block of transform coefficients and signaling (e.g., generation of syntax elements of a bitstream) associated with the selected quantization granularity. In an example, a video encoder may signal in an encoded bitstream, and a video decoder may decode, a quantization granularity indication at a slice level and/or at a block level.

In an example, aspects of this disclosure relate to a method of coding video data that includes determining a quantization parameter (QP) for coding residual video data, wherein the QP is indexed to a quantizer step size; determining a quantization scaling value for scaling the quantizer step size; applying the quantization scaling value scaling to the quantizer step size; and coding the residual video data using the scaled quantizer step size.

In another example, aspects of this disclosure relate to an apparatus for coding video data that includes one or more processors configured to determine a quantization parameter (QP) for coding residual video data, wherein the QP is indexed to a quantizer step size; determine a quantization scaling value for scaling the quantizer step size; apply the quantization scaling value scaling to the quantizer step size; and code the residual video data using the scaled quantizer step size.

In another example, aspects of this disclosure relate to an apparatus for coding video data that includes means for determining a quantization parameter (QP) for coding residual video data, wherein the QP is indexed to a quantizer step size; means for determining a quantization scaling value for scaling the quantizer step size; means for applying the quantization scaling value scaling to the quantizer step size; and means for coding the residual video data using the scaled quantizer step size.

In another example, aspects of this disclosure relate to a non-transitory computer-readable storage medium having instructions stored thereon that, when executed, cause one or more processors to determine a quantization parameter (QP) for coding residual video data, wherein the QP is indexed to a quantizer step size; determine a quantization scaling value for scaling the quantizer step size; apply the quantization scaling value scaling to the quantizer step size; and code the residual video data using the scaled quantizer step size.

In another example, aspects of this disclosure relate to a method of coding video data that includes selecting between at least a first quantization granularity and a second, different quantization granularity, wherein quantization granularity comprises an extent to which a predetermined amount of quantization is subdivided; and coding one or more transform coefficients associated with residual video data using the selected quantization granularity.

In another example, aspects of this disclosure relate to an apparatus for coding video data that includes one or more processors configured to select between at least a first quantization granularity and a second, different quantization granularity, wherein quantization granularity comprises an extent to which a predetermined amount of quantization is subdivided; and code one or more transform coefficients associated with residual video data using the selected quantization granularity.

In another example, aspects of this disclosure relate to an apparatus for coding video data that includes means for selecting between at least a first quantization granularity and a second, different quantization granularity, wherein quantization granularity comprises an extent to which a predetermined amount of quantization is subdivided; and means for coding one or more transform coefficients associated with residual video data using the selected quantization granularity.

In another example, aspects of this disclosure relate to a non-transitory computer-readable storage medium having instructions stored thereon that, when executed, cause one or more processors to select between at least a first quantization granularity and a second, different quantization granularity, wherein quantization granularity comprises an extent to which a predetermined amount of quantization is subdivided; and code one or more transform coefficients associated with residual video data using the selected quantization granularity.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
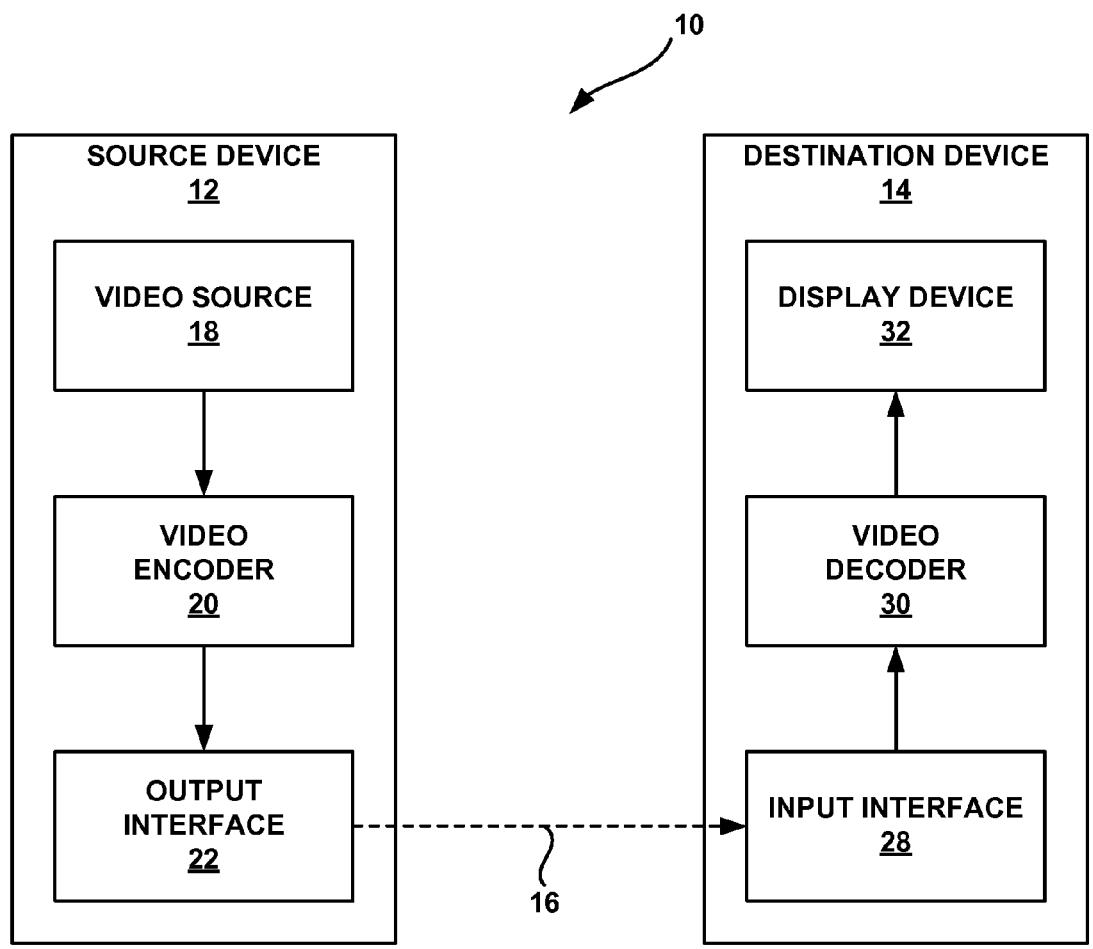
FIG. 1 is a block diagram illustrating an example video encoding and decoding system that may utilize the techniques of this disclosure.

In general, encoded video data may include prediction data and residual data. For example, a video encoder may produce prediction data during an intra-prediction mode or an inter-prediction mode. Intra-prediction generally involves predicting the pixel values in a block of a picture relative to reference samples in neighboring, previously coded blocks of the same picture. Inter-prediction generally involves predicting the pixel values in a block of a picture relative to data of a previously coded picture.

Following intra- or inter-prediction, the video encoder may calculate residual pixel values for the block. The residual values generally correspond to differences between the predicted pixel value data for the block and the true pixel value data of the block. For example, the residual values may include pixel difference values indicating differences between coded pixels and predictive pixels. The coded pixels may be associated with a block of pixels to be coded, and the predictive pixels may be associated with one or more blocks of pixels used to predict the coded block.

To further compress the residual value of a block, the video encoder may transform the residual values into a set of transform coefficients that compact as much data (also referred to as "energy") as possible into as few coefficients as possible. The transform converts the residual values of the pixels from the spatial domain to transform coefficients in a transform domain. The transform coefficients correspond to a two-dimensional matrix of coefficients that is ordinarily the same size as the original block. In other words, ordinarily, there are just as many transform coefficients as pixels in the original block. However, due to the transform, many of the transform coefficients may have values equal to zero.

The video encoder may then quantize the transform coefficients to further compress the video data. Quantization generally involves mapping values within a relatively large range to values in a relatively small range, thus reducing the amount of data needed to represent the quantized transform coefficients. The video encoder may quantize the transform coefficients by applying a quantization parameter (QP) according to a predefined algorithm. The video encoder may modify the degree of quantization applied to the transform coefficient values by adjusting the QP. In some examples, the video encoder may select a QP in a range of 0-51. In other examples, the video encoder may select a QP in a range of −26 to +25 (or some other range). While higher QPs are generally described herein as increasing the amount of quantization that is applied, as described in greater detail below, is should be understood that in other examples, higher QPs may correlate to a decreasing amount of quantization being applied.

According to some examples, a predetermined set of QPs may be indexed to quantizer step sizes. That is, the range of QPs may be indexed to a range of quantizer step sizes from a minimum amount of quantization to a maximum amount of quantization. For example, conventionally, quantization of values may be based on uniform reconstruction quantizers (URQ). The classification rule for quantizing the data may defined by the encoder and similarly applied by the video decoder. One example of quantization is a so-called deadzone plus uniform threshold quantization (DZ-UTQ) approach. In this example, as shown in Equation (1) below, such a dead-zone quantizer may implement a dead-zone parameter $f_0$, with $0 \leq f_0 \leq 0.5$:

$$Z_{ij} = sgn(Y_{ij}) * \left\lfloor \frac{|Y_{ij}|}{Q_{step}} + f_0 \right\rfloor \quad (1)$$

where $Y_{ij}$ is a transform coefficient (described above), $Q_{step}$ is a quantizer step size, and $Z_{ij}$ corresponds to a quantization level or quantization coefficient value, sgn(N) is a signum function that extracts the sign of the real number N, and $\lfloor M \rfloor$ is a floor function that returns the largest integer less than or equal to M. Conceptually, the reconstruction value or de-quantized coefficient value $r_{ij}$ that corresponds to the level $Z_{ij}$ may be derived by multiplying $Z_{ij}$ with the corresponding quantizer step size $Q_{step}$. That is, $r_{ij}=Z_{ij}*Q_{step}$. The quantization and reconstruction process described above represents a mathematically simplified version of what is specified in certain video coding standards (e.g., such as HEVC or AVC/H.264), since the normalization by the corresponding basis functions is neglected for purposes of simplicity and clarity.

According to certain video coding standards, such as H.264 and the proposed HEVC standard, a total of 52 values of $Q_{step}$ may be supported and indexed according to a quantization parameter (QP). Although standards may not normatively specify exact quantizer step-sizes used at an encoder, the quantizer step-size typically increases by a factor of $2^{1/6}$ when QP is increased by one. In other words, a QP increment of one may correspond to approximately a 12.5% increase in $Q_{step}$. Accordingly, the amount of quantization applied to a transform coefficient doubles for every increment of six in QP.

This disclosure generally refers to "quantization granularity" as an extent to which a predefined amount of quantization may be subdivided, or broken down into smaller parts. In some examples, the quantization granularity may be represented as the number of QPs required to double (or halve) the amount of quantization applied. That is, the example in which the amount of quantization applied doubles for every increment of six in QP may be referred to as having a quantization granularity of six. In another example, a quantizer step-size may increase by a factor of $2^{1/12}$ when a QP is increased by one. In this example, the amount of quantization applied to a transform coefficient doubles for every increment of 12 in QP, and may be referred to as a quantization granularity of 12.

To reduce the amount of data that the video encoder must signal in the bitstream, the video encoder may predict a QP for a given block. For example, rather than include the QP itself, the video encoder may identify a change (i.e., a delta) between the actual QP for a current block and some reference QP (e.g., a QP associated with a different block or average of QPs of several neighboring blocks). The video encoder may then signal the delta QP for the current block in the bitstream.

In some examples, the video encoder may vary the QP from one block to another within a picture (or slice). Varying the QP between blocks, sometimes referred to as adaptive quantization, targets visual quality improvement. That is, human eyes are generally more sensitive to degradation within visually "flat" areas (e.g., areas of a slice or picture without much luminance or color variation) than degradation within visually "busy" areas. Accordingly, adaptive quantization attempts to exploit these visual limitations by performing finer quantization on flat areas and coarse quantization on busy areas.

Providing a range of quantizer step sizes may allow a video coder to control a trade-off between bit rate and quality (e.g., which may be referred to as rate-distortion). For example, increasing the QP may decrease the bit rate of the coded video data. The overall quality of the encoded video data, however, may also suffer due to increased errors introduced by the quantization. On the other hand, reducing the quantization parameter may increase the bit rate of the coded data, but may also increase the overall quality.

In some examples, the quantization granularity may be increased by increasing the number of QPs. For example, a video coder may increase the number of QPs from 52 to 104 to increase the quantization granularity, thereby providing greater control over an amount of quantization that is applied to transform coefficients. However, increasing the number of QPs also increasing the signaling overhead associated with indicating a QP. For example, additional bits may be required to signal a relatively greater number of QPs. In addition, the greater control associated with a finer quantization granularity may not be required for all areas of a picture. That is, a visuallay important portion of a picture may benefit from greater quantization granularity (e.g., in terms of rate distortion, as described below), while a relatively high quantization granularity may not be needed for other portions of a picture.

Certain techniques of this disclosure relate to applying a scaling factor to a quantizer step size associated with a QP. Applying such a scaling factor may provide greater control over an amount of quantization that is applied to transform coefficients during video coding. For example, some coding standards may provide 52 QP values that are indexed to quantizer step sizes. At a QP of 0, a minimum quantization is applied. At a QP of 51, a maximum quantization is applied. Moreover, QPs are typically adjusted in whole number increments (e.g., increments of one or more), and quantization is doubled for every QP increment of six. Aspects of this disclosure relate to scaling a quantizer step size to provide greater control than the 52 standard increments.

In an example, a video encoder may select a QP for quantizing a given block of transform coefficients. The video encoder may then identify the quantizer step size that is indexed to the QP. Prior to applying the quantizer step size, the video encoder may apply a quantization scaling value to the quantizer step size. The quantization scaling value may increase (or decrease) the quantizer step size less than that of the next quantizer step size that is indexed to the next QP. In this way, the video encoder has greater control (e.g., relative to selecting whole integer QPs) over the amount of quantization applied to a block of transform coefficients. In certain video coding modes such as transform skip mode, the transform may be absent and quantization may be applied to the prediction residual directly.

In some examples, a video encoder may include an indication of the quantization scaling value at the slice level or at a block level (e.g., at a largest coding unit (LCU) level, as defined in HEVC and described below). At the slice level, the quantization scaling value may be indicated separately based on block type. For example, a different value of the quantization scaling value may be indicated within a slice header for different block types (e.g. an intra predicted block, an inter predicted block, a luma block, a chroma block, or the like). In this example, when the quantization scaling value is signaled within slice header, the quantizer step size may be adjusted by the quantization scaling value for every block in the slice. In other examples, the quantization scaling value may be signaled at an LCU level, such that the quantization scaling value is only applied to blocks inside an LCU. Moreover, in some examples, a flag may be set (e.g., at the slice level and/or the LCU level) to indicate that the quantization scaling value has been applied.

The techniques of this disclosure may aid in achieving a desired bit rate and/or rate-distortion level. In an example for purposes of illustration, assume a first QP is applied during coding such that the target bit rate is approached but not exceeded. Decreasing the first QP by a full integer (thereby reducing the amount of quantization applied to one or more transform coefficients), however, may increase the bit rate above the target bit rate. In this example, a video coder may apply a quantization scaling factor to the quantizer step size that is indexed to the first QP to achieve the target bit rate.

Other aspects of this disclosure relate to controlling a granularity with which a quantization parameter may be applied by a video coder. Again, "quantization granularity" may refer to an extent to which a predefined amount of quantization may be subdivided. Aspects of the disclosure relate to changing (e.g., increasing or decreasing) the amount that a predetermined total quantization is subdivided.

For example, as noted above, where some video coding standards subdivide a total quantization using 52 QPs with a quantization granularity of 6. In an example according to aspects of this disclosure, the relationship between QPs and quantizer step-sizes can be modified such that the quantizer step size doubles when QP is increased by 12. That is, each time that a QP increases by one, the quantizer step-size would increase approximately by a factor of $2^{1/12}$, which may be referred to as a quantization granularity of 12. While certain examples of this disclosure are described with respect to quantization granularities of 6 and 12 for purposes of illustration, it should be understood that the techniques are more generally applicable to controlling any quantization granularities.

Increasing the quantization granularity may provide a video coder additional rate-control (e.g., control over the rate distortion discussed above), and/or may allow the video coder finer control when performing perceptual bit-allocation (e.g., allocating a greater number of bits to perceptually complex areas of a picture). A finer quantization granularity, however, may not be needed for all regions of a slice or picture.

Accordingly, some aspects of this disclosure relate to adaptively changing the quantization granularity within a picture or slice. In an example, a video encoder may signal a quantization granularity (which may be referred to as "QP granularity") at a slice level or a block level. A slice header, for example, may contain a syntax element that specifies the QP granularity for the slice, while syntax elements included with one or more blocks may specify the QP granularity for the one or more blocks.

In the example in which a video encoder signals the QP granularity in a slice header, another flag may also be included that indicates whether the QP granularity is adaptive within the slice. For example, the video encoder may indicate whether QP granularity changes from one block to another within the slice. If an adaptive granularity is used, another syntax element may indicate the maximum allowable granularity for the slice.

In an example in which adaptive granularity within a slice is enabled, the video coder may indicate a QP granularity via a syntax element at an LCU level, as described in greater detail below. For example, the syntax element may identify the QP granularity for the LCU, similar to the indication described with respect to the slice header above. The indication of the LCU syntax element may use a context consisting of the value of the neighboring syntax elements (in a causal order) (e.g., for entropy coding). In other examples, the QP granularity may be signaled at a smaller or larger granularity than an LCU. A granularity smaller than an LCU may offer fine control over bit-rate and subjective quality, but may cost a relative lot in terms of bits needed to provide such signaling (which may be referred to as side information). However, a granularity larger than an LCU may not offer adequate control spatially.

As noted above, a QP may be indicated using a delta QP. For example, to reduce the amount of data that a video encoder must signal in a bitstream, the video encoder may predict a QP for a given block. Accordingly, rather than include the actual QP used to quantize transform coefficients of a block or slice, the video encoder may identify a change (i.e., a delta) between the actual QP for a current block and some reference QP (e.g., a QP associated with a different block or averaged over plurality of neighboring blocks). The video encoder may then signal the delta QP for the current block in the bitstream.

When generating a delta QP, the video encoder may identify a reference QP that is associated with a block that spatially neighbors the current block (e.g., a neighboring block in the same slice or picture). For example, an H.264 compliant encoder may signal a delta QP at macroblock level, using the previous macroblock's QP as a reference QP for a current macroblock. Other possibilities include top and left neighbors or temporally collocated blocks or other blocks based on motion vectors.

In examples in which the QP granularity is adaptive, a block used for QP prediction may have a different QP granularity that a block currently being coded. In such examples, according to aspects of this disclosure, a video coder may map each QP from a first granularity to a QP of a second, different QP granularity. For example, QPs having QP granularities of 12 and 6 may be present in a given slice. A video coder may map a QP from the lower QP granularity to a QP from the higher QP granularity prior to determining a delta QP. That is, the QPs having QP granularities of 6 may be mapped to QPs having the QP granularities of 12 using the function 2n, where n is related to a QP granularity of 6. In such an example, n may take values from 0 to 51. In other examples, the video coder may map QPs from a higher granularity to a lower granularity using an inverse of the function described above.

FIG. 1 is a block diagram illustrating an example video encoding and decoding system 10 that may perform the techniques of this disclosure for performing quantization (including inverse-quantization) of transform coefficients. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage medium 34 or file server 36) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

The techniques of this disclosure, which generally relate to entropy coding data, are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding motion vectors and for performing bi-prediction in HEVC and its extensions, such as multiview or 3DV extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for for entropy coding video data may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. In particular, this disclosure refers to a "coded unit" as a unit of data including multiple blocks, such as a slice, picture, set of wavefronts, or tile. Thus, the term "coded unit" should be understood to include multiple blocks, e.g., multiple largest coding units (LCUs). Moreover, the term "coded unit" should not be confused with the terms "coding unit" or CU as used in HEVC. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes. A recent draft of the HEVC standard, referred to as "HEVC Working Draft 7" or "WD7," is described in document JCTVC-I1003, Bross et al., "High efficiency video coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012 which, as of Jun. 15, 2012, is downloadable from http://phenix.it-sudparis.eu/jct/doc_end_user/documents/9_Geneva/wg11/JCTVC-I1003-v3.zip and is hereby incorporated by reference.

In general, the working model of the HM describes that a video picture (or "frame," which may be used interchangeably with "picture") may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Video encoder 20 may then quantize the transform coefficients to further compress the video data. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Quantization may be applied according to a quantization parameter (QP), which may be indexed to a quantizer step size that is applied to a transform coefficient during quantization. Video encoder 20 may modify the degree of quantization (e.g., the quantizer step size) by adjusting the QP. For example, according to some video coding standards, such as H.264 and the emerging HEVC standard, video encoder 20 may select a QP in a range of 0-51 in whole integer increments (although other ranges are possible, such as −26 to +25, or another range). Video encoder 20 may apply the quantizer step size associated with the selected QP.

To further reduce the amount of data that video encoder 20 signals in the bitstream, video encoder 20 may predict a QP for a given block. For example, rather than include the QP itself, video encoder 20 may identify a change (i.e., a delta) between the actual QP for a current block and some reference QP (e.g., a QP associated with a different block or QP averaged over a plurality of neighboring blocks). Video encoder 20 may then signal the delta QP for the current block in the bitstream. In some examples, the reference QP may be associated with a block that spatially neighbors the block currently being encoded. In other examples, the reference QP may be associated with a block in a different temporal instance than the block currently being encoded.

Video encoder 20 may signal (e.g., include syntax elements in an encoded bitstream) the QP or delta QP at a slice level or at an LCU level or for a group of CUs. For example, video encoder 20 may identify a QP that is to be applied to all transform coefficients in the TUs associated with different PUs of CUs within an LCU. In another example, video encoder 20 may identify a QP that is to be applied to all transform coefficients in all TUs of a slice. In still another example, video encoder 20 may identify a particular QP for one or more specific TUs.

As noted above, the techniques of this disclosure generally relate to controlling an amount of quantization that is applied to one or more transform coefficients during video coding. For example, video encoder 20 may initially select a QP for quantizing a given transform coefficient. Prior to applying the quantizer step size associated with the selected QP, video encoder 20 may apply a quantization scaling value to the quantizer step size. That is, a variable scaling value may be applied to a fixed quantizer step size. The quantization scaling value may increase (or decrease) the quantizer step size less than that of the next quantizer step size that is indexed to the next higher or lower QP. In this way, video encoder 20 has greater control (e.g., relative to selecting whole integer QPs) over the amount that a transform coefficient is quantized.

In addition, the techniques of this disclosure relate to signaling the quantization scaling value. For example, video encoder 20 may signal the quantization scaling value at the slice level or the block level, such as a LCU and/or CU level. At the slice level, video encoder 20 may signal the quantization scaling value separately based on block type. For example, video encoder 20 may signal a different quantization scaling value within a slice header for different block types (e.g. an intra predicted block, an inter predicted block, a luma block, a chroma block, and the like). In this example, video encoder 20 may adjust the quantizer step size via the quantization scaling value for every block in the slice. In another example, video encoder 20 may signal the quantization scaling value at a CU level, such that the quantization scaling value is applied to the CU. In this example, video encoder 20 may, for example, signal the quantization scaling value at the LCU level, such that the quantization scaling value is applied to CUs inside the LCU.

According to some aspects of this disclosure, video encoder 20 may set a flag to indicate whether a quantization scaling value has been applied to a particular block or slice. For example, video encoder 20 may set a flag to a value of zero in a slice header to indicate that no quantization scaling value is applied to the quantizer step sizes of the slice. Alternatively, video encoder 20 may set a flag to a value of one in a slice header to indicate that a quantization scaling value is applied to the quantizer step sizes of the slice. In this example, video encoder 20 may signal the quantization scaling value after the flag. Additionally or alternatively, video encoder 20 may set a flag at the LCU level in a similar manner to indicate whether a quantization scaling value has been applied to blocks within a particular LCU.

According to other aspects, the techniques of this disclosure relate to controlling a quantization granularity for quantizing transform coefficients. That is, separate from the techniques related to a scaling value, video encoder 20 may receive a separate indication of a quantization granularity. As noted above, this disclosure generally refers to "granularity" as an extent to which a predefined amount of quantization may be subdivided, or broken down into smaller parts when performing quantization. For example, quantization granularity may refer to the extent to which a total quantization is subdivided and indexed with QPs, which may then be applied to a transform coefficient during quantization.

Aspects of this disclosure relate to providing video encoder 20 with control over the amount of quantization that is applied by changing the QP index described above. That is, where H.264 coding subdivides a total quantization according to 52 QPs, aspects of the disclosure relate to further subdividing the total quantization for quantizing transform coefficients associated with one or more blocks of a picture. In other examples, the total quantization may be subdivided and indexed to fewer QPs.

In an example, the relationship between QPs and quantizer step-sizes can be modified such that the quantizer step-size doubles when QP is increased by 12. That is, each time that a QP increases by one, the quantizer step-size would increase approximately by a factor of $2^{1/12}$ (e.g., providing 104 QPs to cover the same range of quantizer step-sizes). This example may be referred to as a quantization granularity of 12. Increasing the quantization granularity may provide video encoder 20 with additional rate-control capability (e.g., control over the rate distortion discussed above), and/or may allow video encoder 20 to have finer control when performing perceptual bit-allocation. A finer quantization granularity, however, may not be needed for all regions of a picture. In such cases, the additional bits required to identify an increased quantization granularity may not be worth the added quantization control.

The techniques of this disclosure also relate to adaptively changing the quantization granularity within a picture. For example, according to aspects of this disclosure, video encoder 20 may select a quantization granularity for quantizing a block of video data, as well as signal the selected quantization granularity (e.g., including an indication of the selected quantization granularity in a bitstream). For example, video encoder 20 may provide an indication of a quantization granularity in a slice header, with LCU information, with CU information, with a group of CUs, or the like.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may select a context model to apply to a certain context to encode symbols to be transmitted. The context may relate to, for example, whether neighboring values are non-zero or not. Video encoder 20 may also entropy encode syntax elements, such as a significant coefficient flag and a last coefficient flag produced when performing an adaptive scan. In accordance with the techniques of this disclosure, video encoder 20 may select the context model used to encode these syntax elements based on, for example, an intra-prediction direction, a scan position of the coefficient corresponding to the syntax elements, block type, and/or transform type, among other factors used for context model selection.

In general, the video decoding process performed by video decoder 30 may include reciprocal techniques to the encoding techniques performed by video encoder 20. Although generally reciprocal, video decoder 30 may, in some instances, perform techniques similar to those performed by video encoder 20. Video decoder 30 may also rely on syntax elements or other data contained in a received bitstream that includes the data described with respect to video encoder 20.

In particular, according to aspects of this disclosure, video decoder 30 may perform techniques similar to, or the same as the quantization techniques described above with respect to video encoder 20 when performing inverse quantization. That is, according to aspects of this disclosure, video decoder 30 may receive an indication of a quantization scaling value at the slice level, as well as a coding unit level (e.g., largest coding unit level, as defined in HEVC).

At the slice level, video decoder 30 may receive an indication of a quantization scaling value separately based on block type. For example, video decoder 30 may receive a different quantization scaling value within a slice header for different block types. In this example, video decoder 30 may adjust the quantizer step size via the quantization scaling value for every block in the slice. In another example, video decoder 30 may receive an indication of the quantization scaling value at an LCU and/or CU level, e.g., in an LCU or CU header, such that the quantization scaling value is only applied to the QP by video decoder 30 to control quantization for TU's for certain blocks of a slice.

Video decoder 30 may apply the received quantization scaling value during de-quantization. For example, video decoder 30 may initially identify a QP for de-quantizing a given transform coefficient. Prior to applying the quantizer step size associated with the selected QP, video decoder 30 may apply a quantization scaling value to the quantizer step size. The quantization scaling value may increase (or decrease) the quantizer step size less than that of the next quantizer step size (e.g., associated with an integer QP) that is indexed to the next higher or lower QP.

According to other aspects, video decoder 30 may receive an indication of a quantization granularity. That is, separate from the techniques related to a scaling value, video decoder 30 may receive a separate indication of a quantization granularity. For example, video decoder 30 may receive an indication of a quantization granularity for de-quantizing a block of video data. In some examples, video decoder 30 may receive quantization granularity signal at a slice level or an LCU level or CU level or for group of CUs.

In the example in which QP granularity is signaled in a slice header, video decoder 30 may receive another flag that indicates whether the QP granularity is adaptive within the slice. For example, video decoder 30 may determine whether QP granularity changes from one LCU to another within the slice based on one or more received syntax elements. If an adaptive granularity is used, another syntax element may be provided that indicates the maximum allowable granularity for the slice.

In an example in which adaptive granularity within a slice is enabled, the QP granularity may be signaled via a syntax element at the LCU level. For example, the syntax element may identify the QP granularity for the LCU, similar to the signaling in the slice header described above. The signaling of the LCU syntax element may use a context consisting of the value of the neighboring syntax elements (in a causal order) (e.g., for entropy coding).

In some examples, video decoder 30 may also determine whether to map QPs from one QP granularity to another QP granularity. That is, in examples in which a delta QP is received, video decoder 30 may scale the predictive QP and/or the delta QP for coding the current block so that the QP granularities match. Video decoder may then determine the QP for inverse quantizing the current block based on a combination (e.g., sum) of the predictive QP and the delta QP.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Figure 2:
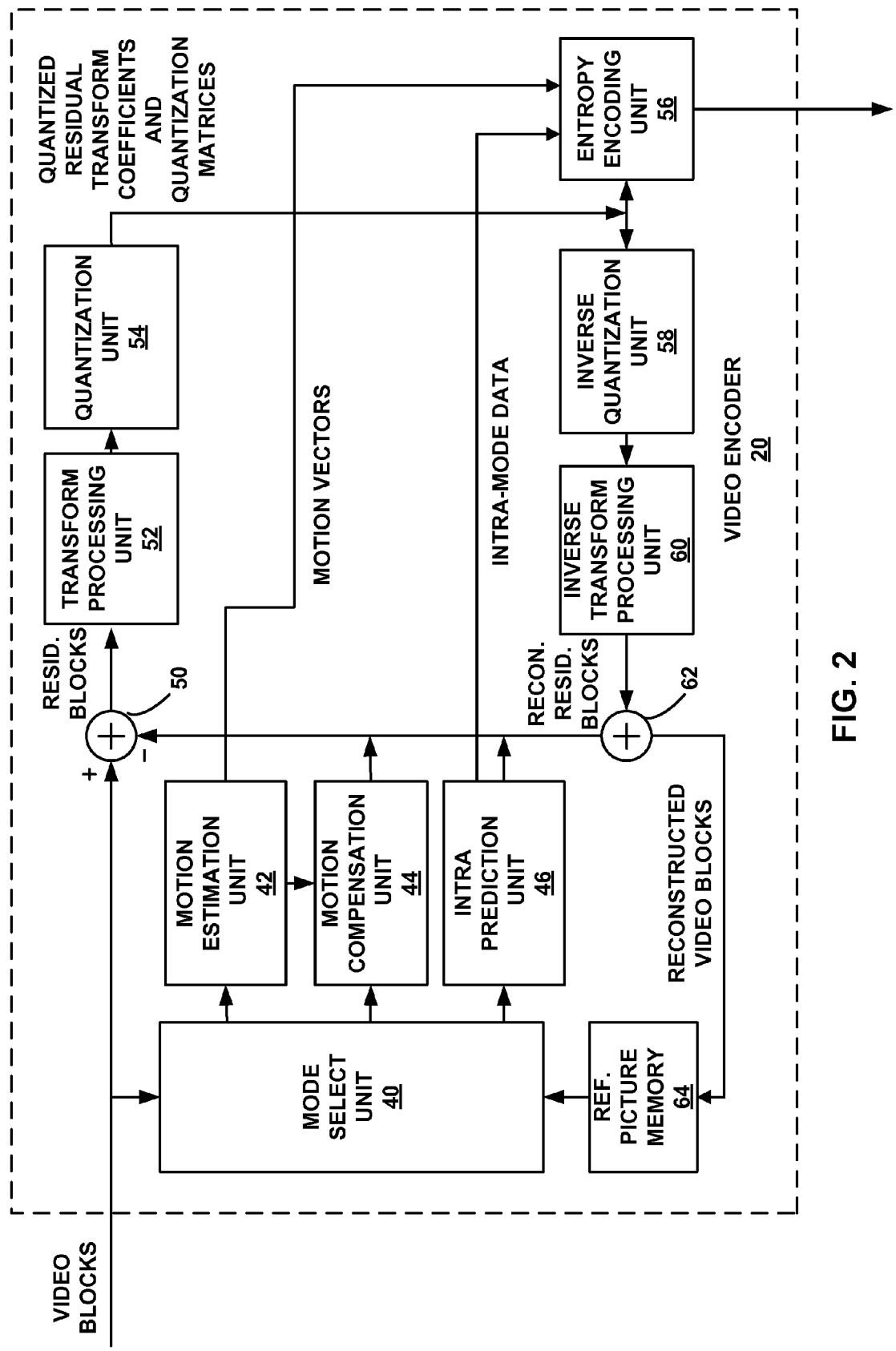
FIG. 2 is a block diagram illustrating an example of a video encoder that may implement any or all of the techniques of this disclosure.

FIG. 2 is a block diagram illustrating an example of video encoder 20 that may implement techniques for controlling an amount of quantization that is applied to one or more transform coefficients during video coding. It should be understood that certain components of FIG. 2 may be shown and described with respect to a single component for conceptual purposes, but may include one or more functional units. In addition, while certain components of FIG. 2 may be shown and described with respect to a single component, such components may be physically comprised of one or more than one discrete and/or integrated units.

As shown in FIG. 2, video encoder 20 receives a current video block within a video picture to be encoded. In the example of FIG. 2, video encoder 20 includes mode select unit 40, motion estimation unit 42, motion compensation unit 44, intra-prediction unit 46, reference picture memory 64, summer 50, transform processing unit 52, quantization unit 54, and entropy encoding unit 56. For video block reconstruction, video encoder 20 also includes inverse quantization unit 58, inverse transform unit 60, and summer 62.

Video encoder 20 generally illustrates the components that encode video blocks within a video slice to be encoded. The slice may be divided into multiple video blocks (and possibly into sets of video blocks referred to as tiles). Mode select unit 40 may select one of a plurality of possible coding modes, such as one of a plurality of intra coding modes or one of a plurality of inter coding modes as described below, for the current video block based on error results (e.g., coding rate and the level of distortion). Mode select unit 40 may provide the resulting intra- or inter-coded block to summer 50 to generate residual block data and to summer 62 to reconstruct the encoded block for use as a reference picture.

Motion estimation unit 42 and motion compensation unit 44 perform inter-predictive coding of the received video block relative to one or more blocks in one or more reference pictures. Motion estimation unit 42 and motion compensation unit 44 may be highly integrated, but are illustrated separately for conceptual purposes.

In general, motion estimation, as performed by motion estimation unit 42, is the process of generating motion vectors, which estimate motion for video blocks. A motion vector, for example, may indicate the displacement of a predictive block within a predictive reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. Predictive blocks may also be referred to as "reference blocks," as the predictive blocks are referred to during inter-prediction.

Accordingly, motion estimation unit 42 may calculate a motion vector for a video block of an inter-coded picture by comparing a block currently being coded to reference blocks of a reference picture in reference picture memory 64. The ITU-T H.264 standard refers to "lists" of reference pictures, e.g., list 0 and list 1. List 0 includes reference pictures having a display order earlier than the current picture, while list 1 includes reference pictures having a display order later than the current picture. In other coding schemes, a single list may be maintained. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

In any case, after selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Transform processing unit 52 applies a transform, such as a discrete cosine transform (DCT), an integer transform approximating a DCT, a fixed point transform approximating the DCT or a conceptually similar transform, to the residual block, producing a video block comprising residual transform coefficient values. Transform processing unit 52 may perform other transforms, such as those defined by the H.264 standard, which are conceptually similar to DCT. Wavelet transforms, integer transforms, sub-band transforms or other types of transforms could also be used. For some coding modes such as "transform skip" mode, no transformation of the residual pixels may be performed. That is, quantization unit 54, as described below, may quantize the prediction residual directly. In instances in which transform processing unit 52 applies the transform to the residual block, transform processing unit 52 produces a block of residual transform coefficients. Transform processing unit 52 may convert the residual information from a pixel value domain to a transform domain, such as a frequency domain.

Quantization unit 54 quantizes the residual transform coefficients to further reduce bit rate. The quantization process may reduce the bit depth associated with some or all of the coefficients. The degree of quantization may be modified by adjusting a quantization parameter. For example, quantization generally involves mapping values within a relatively large range to values in a relatively small range, thus reducing the amount of data needed to represent the quantized transform coefficients.

Quantization unit 54 may quantize the transform coefficients by applying a QP according to a predefined algorithm. In an example, quantization unit 54 may quantize transform coefficients using Equation (1) described above. Quantization unit 54 may modify the degree of quantization applied to the transform coefficient values by adjusting the QP. In some examples, quantization unit 54 may select a QP in a range of 0 to 51, although other QP ranges may be used (e.g., −26 to 26, or other range).

Although standards may not normatively specify quantizer step-sizes used at video encoder 20, in some video encoders, the quantizer step-size typically increases roughly by a factor of $2^{1/16}$ when QP is increased by 1. Accordingly, in examples in which there are 52 QPs, quantization unit 54 may index the QPs to quantizer step sizes as shown in Table 1 below:

TABLE 1

Quantizer Step Size for Quantization Granularity (6)

| QP | 0 | 1 | 2 | 3 | 4 | 5 | 6 | ... |
|---|---|---|---|---|---|---|---|---|
| $Q_{step}$ | 0.625 | 0.6875 | 0.8125 | 0.875 | 1 | 1.125 | 1.25 | ... |
| QP | ... | 18 | ... | 36 | ... | 42 | ... | 51 |
| $Q_{step}$ | | 5 | | 40 | | 80 | | 224 |

In other words, a QP increment of one may correspond to approximately a 12.5% increase in quantizer step size $Q_{step}$. Accordingly, the amount of quantization doubles for every increment of 6 in QP, which may be referred to as a quantization granularity of six. As noted above, the $QP_{step}$ (mapped to by the QP) may be implemented in a particular quantization algorithm, such as that shown in Equation (1) above.

Quantization unit 54 may vary the QP from one block to another within a slice. Varying the QP between blocks or slices, sometimes referred to as adaptive quantization, targets visual quality improvement. When quantization unit 54 changes a quantizer step-size at the LCU or CU level, quantization unit 54 may indicate the change via a syntax element referred to as a delta QP. That is, rather than include the QP itself, quantization unit 54 may identify and signal a change (i.e., a delta) between the actual QP for a current block and some reference QP, such as, for example, a slice QP, a neighboring block QP, or a temporal, co-located block QP.

When generating a delta QP, quantization unit 54 may identify a reference QP that is associated with a block that spatially neighbors the current block (e.g., a neighboring block in the same slice or picture or it may average a plurality of neighboring QPs). For example, an H.264 compliant video encoder 20 may signal a delta QP at macroblock level, using the previous macroblock's QP as a reference QP for a current macroblock. Other possibilities include top and left neighbors or temporally collocated blocks or other blocks based on motion vectors.

By applying a range of quantizer step sizes, quantization unit 54 may control a trade-off between bit rate and quality (e.g., which may be referred to as rate-distortion). For example, increasing the quantization parameter may decrease the bit rate of the coded data. The overall quality of the encoded video data, however, may suffer due to increased errors introduced by the quantization. On the other hand, reducing the quantization parameter may increase the bit rate of the coded data while increasing the overall quality.

The techniques of this disclosure relate to controlling an amount of quantization that is applied to one or more transform coefficients. For example, according to aspects of this disclosure, quantization unit 54 may apply a quantization scaling value to adjust a quantizer step size that is applied during quantization. For purposes of illustration, as noted above, the H.264 standard may provide 52 QPs that are indexed to quantizer step sizes. At a QP of 0, a minimum quantization is applied. At a QP of 51, a maximum quantization is applied. Moreover, QPs are typically adjusted in whole number increments (e.g., increments of one or more), and quantization is doubled for every QP increment of six. According to aspects of this disclosure, quantization unit 54 may apply a scaling factor to the quantizer step sizes to achieve finer quantizer step size than that which may be achieved with integer changes of a QP.

In an example, quantization unit 54 may select a QP for quantizing a given transform coefficient. Quantization unit 54 may then identify the quantizer step size that is indexed to the QP. Prior to applying the quantizer step size, quantization unit 54 may apply a quantization scaling value to the quantizer step size. The quantization scaling value may increase (or decrease) the quantizer step size less than that of the next quantizer step size that is indexed to the next QP. In this way, quantization unit 54 has greater control (e.g., relative to selecting whole integer QPs) over the amount that a transform coefficient is quantized.

According to aspects of this disclosure, quantization unit 54 may apply a quantization scaling value s during quantization and signal the quantization scaling value s, for example, in a bitstream. Quantization unit 54 may use the quantization scaling value s to adjust the quantizer step size corresponding to a certain QP according to Equation (2) shown below:

$$T_s = T*(1+s) \quad (2)$$

where T represents a current quantizer step size indicated by a current QP. In this example, s can be either a positive or negative value, and $T_s$ represents the actual quantizer step size that is applied by the encoder or decoder.

As noted above, certain coding standards such as H.264 and the currently proposed HEVC standard have a QP granularity of six. That is, increasing or decreasing the QP by one may result in the changes in quantizer step size identified by the Equations (3) and (4) shown below:

$$T_{QP+1} = T_{QP}*2^{(1/6)} = T_{QP}*(1+(2^{1/16}-1)) \quad (3)$$

$$T_{QP-1} = T_{QP}*2^{(-1/6)} = T_{QP}*(1+(2^{(-1/6)}-1)) \quad (4)$$

In Equations (3) and (4) above $T_{QP}$ is associated with a particular quantizer step size. When Equation (2) is considered with Equations (3) and (4), as long as s takes a value between $(2^{(-1/6)}-1)$ and $(2^{(1/6)}-1)$, a finer granularity quantizer step size $T_s$ may be obtained. In this example, the quantizer step size granularity may be dependent on the precision of quantization scaling value s. In addition, quantization unit 54 may signal quantization scaling value s independently from QPs, which may provide additional freedom when varying a quantizer step size.

Quantization unit 54 may use the quantization scaling value in order to obtain a desired bit rate and/or rate-distortion. For example, quantization unit 54 may apply a first quantization parameter during quantization to achieve but not exceed a target bit rate. Decreasing the first quantization parameter by a full integer (thereby reducing the amount of quantization applied to one or more transform coefficients), however, may increase the bit rate above the target. In this example, quantization unit 54 may apply scaling factor s to the quantizer step size that is indexed to the first quantization parameter to achieve the target bit rate. That is, quantization unit 54 may determine the step size associated with the first quantization parameter, apply the scaling factor s to the determined step size, and apply the scaled quantizer step size in a predefined quantization algorithm.

In some examples, quantization unit 54 may provide an indication of a quantization scaling value at the slice level or block level. At the slice level, quantization unit 54 may indicate the quantization scaling value separately based on block type. For example, quantization unit 54 may signal a different quantization scaling value within a slice header for different block types (e.g. an intra block, an inter block, a luma block, a chroma block, or the like). In this example, the quantization scaling value may be applied to every block in the slice. In some examples, quantization unit 54 may also indicate the quantization scaling value at an LCU and/or CU level, such that the quantization scaling value is only applied to certain CUs or sub-CUs within an LCU.

According to some aspects of this disclosure, quantization unit 54 may indicate the quantization scaling value according to a delta quantization scaling value. That is, quantization unit 54 may generate a difference between a quantization scaling value for a current block or slice and some other quantization scaling value (e.g., a quantization scaling value associated with a reference block or slice). Quantization unit 54 may then indicate the delta quantization scaling value, for example, using one or more syntax elements in a bitstream.

According to some aspects of this disclosure, quantization unit 54 may set a flag to indicate whether a quantization scaling value has been applied to a particular block or slice. For example, quantization unit 54 may set a flag to a value of zero in a slice header to indicate that no quantization scaling value is applied to the quantizer step sizes of the slice. In this case, the standard quantizer step size is used. Alternatively, quantization unit 54 may set a flag to a value of one in a slice header to indicate that a quantization scaling value is applied to the quantizer step sizes of the slice. In this example, quantization unit 54 may signal the quantization scaling value after the flag. Additionally or alternatively, quantization unit 54 may set a flag at the block level in a similar manner to indicate whether a quantization scaling value has been applied to blocks within a particular LCU.

According to other aspects of this disclosure, quantization unit 54 may modify a quantization granularity. For example, aspects of this disclosure relate to providing quantization unit 54 with an increased control over the amount of quantization that is applied by refining the QP index. In an example, assume a baseline quantization granularity of 6 with a total quantization subdivided according to 52 QPs. According to aspects of this disclosure, quantization unit 54 may modify the relationship between QPs and quantizer step-sizes such that the quantizer step-size doubles when QP is increased by 12. That is, each time that a QP increases by one, the quantizer step-size increases approximately by a factor of $2^{1/12}$ (e.g., providing 104 QPs). This example may be referred to as a quantization granularity of 12.

Increasing the quantization granularity may provide quantization unit 54 additional rate-control (e.g., control over the rate distortion discussed above), and/or may allow the video coder finer control when performing perceptual bit-allocation. A finer quantization granularity, however, may not be needed for all regions of a video picture (or slice). For example, the proposed HEVC standard may allow signaling of QP (or delta QP) for each 8×8 block of video data. A relatively coarse quantization may be sufficient for some blocks of video data. That is, a desired rate-distortion may be achieved using a relatively coarse granularity. In such cases, the additional bits required to identify an increased quantization granularity may not be worth the added quantization control.

According to some aspects of this disclosure, quantization unit 54 may adaptively change the quantization granularity within a slice. For example, quantization unit 54 may select a QP granularity for quantizing a block of video data, as well as indicate the selected QP granularity. In some examples, quantization unit 54 may indicate QP granularity at a slice level. For example, quantization unit 54 may include a syntax element in a slice header that specifies the QP granularity. The syntax element may specify the QP granularity, or may be an index pointing to one of several pre-defined QP granularities. For example, a pointer value of 0 may specify a relative lowest granularity, a pointer value of 1 may specify a relatively higher granularity, and the like. In this example, a pointer value of 0 may identify the existing AVC/H.264 scheme (QP granularity of 6), and a pointer value of 1 may identify a doubling of the lower granularity (QP granularity of 12).

In the example in which QP granularity is signaled in a slice header, another flag may follow that indicates whether the QP granularity is adaptive within the slice. For example, quantization unit 54 may indicate whether QP granularity changes from one LCU to another within the slice. If an adaptive granularity is signaled, the slice pointer may indicate the maximum allowable granularity for the slice.

In an example in which adaptive granularity within a slice is enabled, the QP granularity may be signaled via a syntax element at the LCU level. For example, the syntax element may identify the QP granularity for the LCU, similar to the signaling in the slice header described above. Quantization unit 54 may indicate the LCU syntax element using context that includes the value of the neighboring syntax elements (e.g., any predetermined syntax elements associated with a neighboring block) in a particular (causal) order.

In examples in which QP granularity is adaptive, quantization unit 54 may performing QP granularity mapping to properly determine and indicate a delta QP. For example, a block used for QP prediction may have a different QP granularity than a block currently being encoded. According to aspects of this disclosure, quantization unit 54 may map one or both of the current QP and the predictive QP so that the QP granularities match. In an example, QPs having QP granularities of 12 and 6 may be present in a given slice (or picture). Quantization unit 54 may map QP values of 2n and 2n+1 for the higher granularity (e.g., a QP granularity of 12) to a QP value of a lower granularity (e.g., a QP granularity of 6). In such an example, n may take values from 0 to 51. In other examples, an inverse mapping may be performed, mapping lower QP granularities to higher QP granularities.

A metric for determining such a mapping function may be to consider the distances between quantizer step-sizes corresponding to the respective QPs. In this example, multiple high granularity QPs may map to a single low granularity QP. A similar inverse mapping function can be used to map each QP from lower QP granularity to a QP from the higher QP granularity. For example, if QP granularities of 6 and 12 are used, quantization unit 54 may map a QP of n, n=0, 1, 2 . . . 51 to a higher granularity QP of 2n.

In an example, quantization unit 54 may maintain all QPs at a high QP granularity. If a particular LCU used for QP prediction has lower QP granularity, quantization unit 54 may convert the QPs for blocks belonging to the particular LCU to a higher QP granularity by using the mapping function described above. Quantization unit 54 may then perform the QP prediction at the higher QP granularity. That is, quantization unit 54 may determine a delta QP for the current block at the higher QP granularity. On the other hand, if the current block has lower QP granularity, quantization unit 54 may use the mapping function to convert the predicted QP value to lower QP granularity. Quantization unit 54 may then form the delta QP for the current block at the lower QP granularity.

In another example, all the QPs may be maintained at the lower QP granularity. If a particular LCU used for QP prediction has a high QP granularity, quantization unit 54 may convert the QP values for blocks belonging to that LCU to a lower QP granularity by using the mapping function described above. Quantization unit 54 then forms the QP prediction at the lower QP granularity. That is, quantization unit 54 may determine a delta QP for the current block at the lower QP granularity. On the other hand, if the current block has higher QP granularity, quantization unit 54 may apply the mapping function to convert the predicted QP to the higher QP granularity. Quantization unit 54 may then form a delta QP for the current block at the higher QP granularity. Alternatively, in this case, once quantization unit 54 performs QP prediction at the lower QP granularity, quantization unit 54 may form the delta QP at lower granularity as well. Quantization unit 54 may accomplish this by converting the higher granularity QP for the current block to lower granularity by using the mapping function. Quantization unit 54 then signals additional information to specify the actual high granularity QP from a set of high granularity QPs that map to the specific low granularity QP.

In some instances, more than one reference QP may be combined (e.g., a plurality of reference QPs may be averaged). In such instances, a similar mapping technique may be performed to conform all the reference QPs to the same granularity prior to combining the reference QPs.

Following quantization, entropy encoding unit 56 entropy codes the quantized transform coefficients. For example, entropy encoding unit 56 may perform content adaptive variable length coding (CAVLC), context adaptive binary arithmetic coding (CABAC), or another entropy coding technique. Following the entropy coding by entropy encoding unit 56, the encoded video may be transmitted to another device or archived for later transmission or retrieval. In the case of context adaptive binary arithmetic coding (CABAC), context may be based on neighboring macroblocks.

In some cases, entropy encoding unit 56 or another unit of video encoder 20 may be configured to perform other coding functions, in addition to entropy coding. For example, entropy encoding unit 56 may be configured to determine the CBP values for the macroblocks and partitions. Also, in some cases, entropy encoding unit 56 may perform run length coding of the coefficients in a macroblock or partition thereof. In particular, entropy encoding unit 56 may apply a zig-zag scan or other scan pattern to scan the transform coefficients in a macroblock or partition and encode runs of zeros for further compression. Entropy encoding unit 56 also may construct header information with appropriate syntax elements for transmission in the encoded video bitstream.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video picture.

Figure 3:
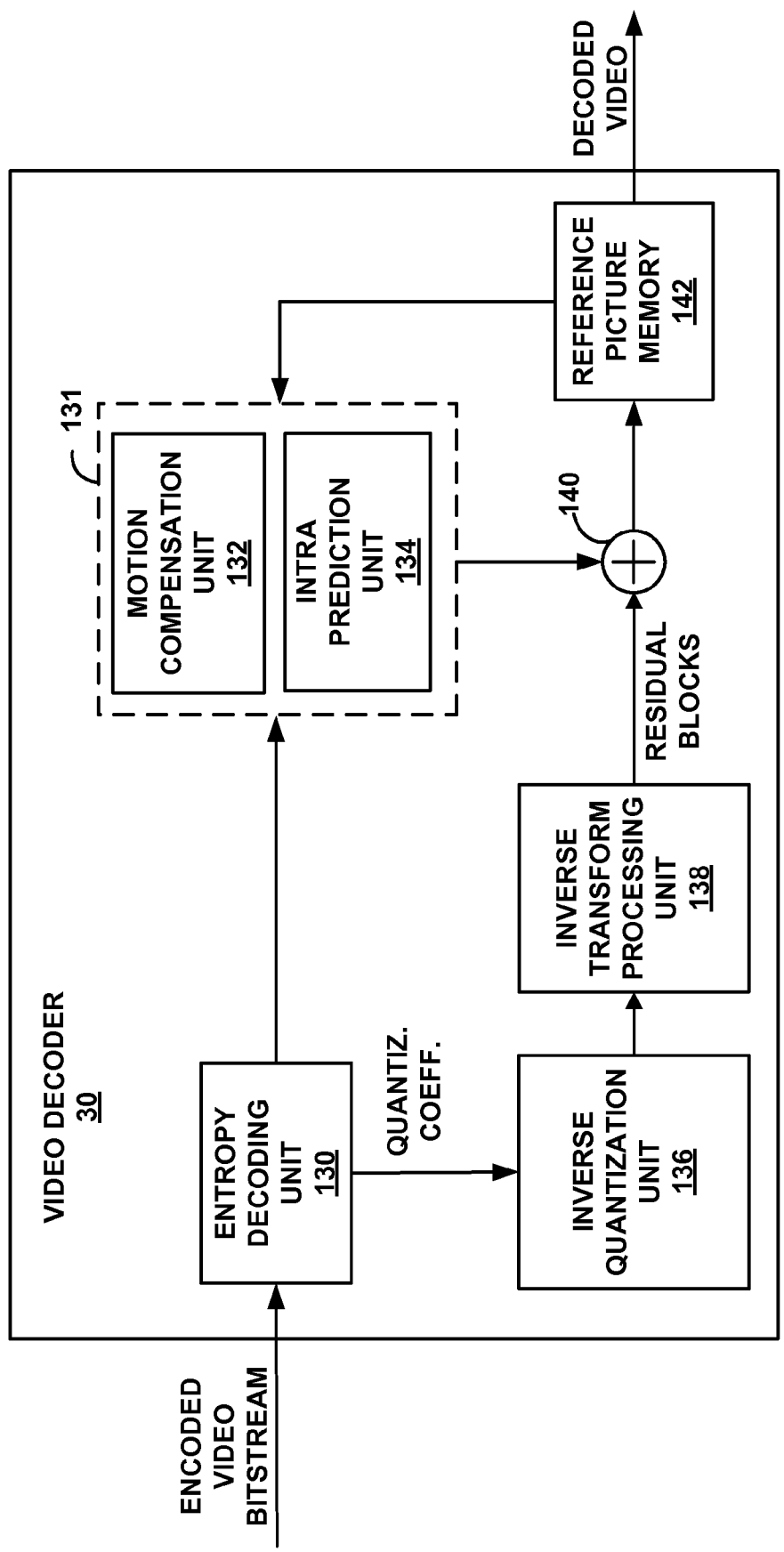
FIG. 3 is a block diagram illustrating an example of a video decoder, which decodes an encoded video sequence.

FIG. 3 is a block diagram illustrating an example of video decoder 30, which decodes an encoded video sequence. In the example of FIG. 3, video decoder 30 includes an entropy decoding unit 130, a prediction unit 131 having a motion compensation unit 132 and intra prediction unit 134, an inverse quantization unit 136, an inverse transformation unit 138, a reference picture memory 142 and summer 140.

During the decoding process, video decoder 30 receives an encoded video bitstream that represents video blocks of an encoded video slice and associated syntax elements from video encoder 20. Entropy decoding unit 130 of video decoder 30 entropy decodes the bitstream to generate quantized coefficients, motion vectors, and other syntax elements. Entropy decoding unit 130 forwards the motion vectors and other syntax elements to prediction unit 131. Video decoder 30 may receive the syntax elements at the video slice level and/or the video block level.

When the video slice is coded as an intra-coded (I) slice, intra prediction unit 134 of prediction unit 131 may generate prediction data for a video block of the current video slice based on a signaled intra prediction mode and data from previously decoded blocks of the current picture. When the video picture is coded as an inter-coded (i.e., B, P or GPB) slice, motion compensation unit 132 of prediction unit 131 produces predictive blocks for a video block of the current video slice based on the motion vectors and other syntax elements received from entropy decoding unit 130. The predictive blocks may be produced from one of the reference pictures within one of the reference picture lists. Video decoder 30 may construct the reference picture lists, List 0 and List 1, using default construction techniques based on reference pictures stored in reference picture memory 142.

Motion compensation unit 132 determines prediction information for a video block of the current video slice by parsing the motion vectors and other syntax elements, and uses the prediction information to produce the predictive blocks for the current video block being decoded. For example, motion compensation unit 132 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 132 may also perform interpolation based on interpolation filters. Motion compensation unit 132 may use interpolation filters as used by video encoder 20 during encoding of the video blocks to calculate interpolated values for sub-integer pixels of reference blocks. In this case, motion compensation unit 132 may determine the interpolation filters used by video encoder 20 from the received syntax elements and use the interpolation filters to produce predictive blocks. Intra prediction unit 134 may use intra prediction modes received in the bitstream to form a prediction block from spatially adjacent blocks.

Inverse quantization unit 136 inverse quantizes, i.e., de-quantizes, the quantized block coefficients provided in the bitstream and decoded by entropy decoding unit 130. According to some aspects of this disclosure, inverse quantization unit 136 may be configured to operate in a manner generally reciprocal to that of quantization unit 54 described above with respect to the video encoder 20 shown in the example of FIG. 2. For example, inverse quantization unit 136 may receive a delta QP signaled by a video encoder, such as video encoder 20. The delta QP may be a difference between an actual QP for inverse quantizing and one or more reference QPs (predictive QPs). Inverse quantization unit 136 may determine the actual QP for performing inverse quantization and inverse quantize received quantized transform coefficients. That is, inverse quantization unit 136 may determine the actual QP based on a combination (e.g., sum) of the received delta QP and the one or more reference QPs.

According to aspects of this disclosure, inverse quantization unit 136 may receive an indication of a quantization scaling value at the slice level or a block level (e.g., an LCU, CU, or group of CUs), e.g., in the encoded bitstream. At the slice level, inverse quantization unit 136 may receive an indication of a quantization scaling value separately based on block type. For example, inverse quantization unit 136 may receive a different quantization scaling value within a slice header for different block types (e.g. an intra block, an inter block, a luma block, a chroma block, or the like). In this example, inverse quantization unit 136 may adjust the quantizer step size via the quantization scaling value for every coding unit in the slice. In another example, inverse quantization unit 136 may receive an indication of the quantization scaling value at a LCU level (or CU level), such that the quantization scaling value is applied by inverse quantization unit 136 to one or more CUs of the LCU.

In some examples, rather than receiving an actual quantization scaling value, inverse quantization unit 136 may receive a delta quantization scaling value. In such examples, video decoder 30 may identify a change between a quantization scaling value for a current block or slice and some reference scaling value.

According to aspects of this disclosure, inverse quantization unit 136 may apply the quantization scaling value during de-quantization. For example, inverse quantization unit 136 may initially identify a QP for de-quantizing a given transform coefficient. Prior to applying the quantizer step size associated with the selected QP, inverse quantization unit 136 may apply a quantization scaling value to the quantizer step size. The quantization scaling value may increase (or decrease) the quantizer step size less than that of the next quantizer step size (e.g., associated with an integer QP) that is indexed to the next higher or lower QP.

In addition, according to aspects of this disclosure, inverse quantization unit 136 may receive an indication of whether a quantization scaling value has been applied to a particular block or slice of video data. For example, inverse quantization unit 136 may receive a flag in a slice header that indicates whether to apply a quantization scaling value during de-quantization of a slice. In another example, inverse quantization unit 136 may receive a flag in an LCU or CU header that indicates whether to apply a quantization scaling value during de-quantization of blocks of the LCU or CU. In examples in which the flag indicates that a scaling value is used, the scaling value may also be signaled. In other instances, the scaling value may be fixed at the decoder.

According to other aspects of this disclosure, inverse quantization unit 136 may identify a quantization granularity for de-quantizing a block of video data. Inverse quantization unit 136 may identify quantization granularity at the slice level or the block level (e.g., an LCU level). For example, a received slice header may contain one or more syntax elements that specify the QP granularity. The syntax elements may specify the QP granularity directly, or may be an index pointing to one of several pre-defined QP granularities (e.g., as described in the three granularity example described above).

In the example in which QP granularity is signaled in a slice header, inverse quantization unit 136 may receive another flag that indicates whether the QP granularity is adaptive within the slice. For example, inverse quantization unit 136 may receive an indication regarding whether QP granularity changes from one LCU to another within the slice. If an adaptive granularity is signaled, the slice pointer may indicate the maximum allowable granularity for the slice.

In an example in which adaptive granularity within a slice is enabled, inverse quantization unit 136 may receive an indication of QP via a received syntax element at the LCU level. For example, the syntax element may identify the QP granularity for the LCU, similar to the signaling in the slice header described above. The signaling of the LCU syntax element may use a context consisting of the value of the neighboring syntax elements (in a causal order) (e.g., for entropy coding).

In examples in which a received bitstream includes an indication of a delta QP, inverse quantization unit 136 may perform QP prediction using similar steps as described above with respect to quantization unit 54 of video encoder 20 (FIG. 2). For example, if the LCU containing the current block has high QP granularity and the QP predictor has a higher QP granularity, inverse quantization unit 136 may determine the QP for inverse quantizing the current block based on a combination of the delta QP and the QP predictor. If the LCU containing the current block has low QP granularity, and the QP predictor has a higher QP granularity (or vice versa), inverse quantization unit 136 may convert one or both of the QPs so that the QPs have the same QP granularity. Inverse quantization unit 136 may then determine the actual QP for inverse quantizing the block based on a combination of the delta QP and QP predictor.

In an example, assume the QP prediction for generating a received delta QP is performed at a relatively high granularity. In this example, if the LCU containing the block currently being decoded has the high QP granularity, inverse quantization unit 136 may add the received delta QP value to the QP prediction value to obtain QP value for the current block. If the LCU containing the block currently being coded has a low QP granularity, inverse quantization unit 136 may convert the QP prediction to a low granularity using a forward mapping function. Inverse quantization unit 136 may then add the received delta QP to low granularity QP prediction to obtain QP value for the current block.

In another example, assume the QP prediction for generating a received delta QP is performed at a relatively low granularity. In this example, if the LCU containing the block currently being decoded has a low QP granularity, inverse quantization unit 136 may add the delta QP to the QP prediction value to obtain QP value for the current block. If the LCU containing the current block has higher QP granularity, inverse quantization unit 136 may apply a reverse mapping function to convert the predicted QP value to the higher QP granularity. Inverse quantization unit 136 may then add the delta QP to the high granularity QP prediction value to obtain the QP for the current block. In other examples, inverse quantization unit 136 may add the delta QP to the low granularity QP prediction value to form a low granularity QP for the current block. In such examples, an additional syntax element may also be decoded by inverse quantization unit 136 to map the low granularity QP to the correct high granularity QP.

In some instances, more than one reference QP may be combined (e.g., a plurality of reference QPs may be averaged). In such instances, a similar mapping technique may be performed to conform all the reference QPs to the same granularity prior to combining the reference QPs.

Inverse transform processing unit 138 applies an inverse transform, e.g., an inverse DCT, an inverse integer transform, or a conceptually similar inverse transform process, to the transform coefficients in order to produce residual blocks in the pixel domain. Motion compensation unit 132 produces motion compensated blocks, possibly performing interpolation based on interpolation filters. Identifiers for interpolation filters to be used for motion estimation with sub-pixel precision may be included in the syntax elements. Motion compensation unit 132 may use interpolation filters as used by video encoder 20 during encoding of the video block to calculate interpolated values for sub-integer pixels of a reference block. Motion compensation unit 132 may determine the interpolation filters used by video encoder 20 according to received syntax information and use the interpolation filters to produce predictive blocks.

Motion compensation unit 132 uses some of the syntax information to determine sizes of macroblocks used to encode picture(s) of the encoded video sequence, partition information that describes how each macroblock of a picture of the encoded video sequence is partitioned, modes indicating how each partition is encoded, one or more reference pictures (or lists) for each inter-encoded macroblock or partition, and other information to decode the encoded video sequence.

Summer 140 sums the residual blocks with the corresponding prediction blocks generated by motion compensation unit 132 or intra-prediction unit to form decoded blocks. If desired, a deblocking filter may also be applied to filter the decoded blocks in order to remove blockiness artifacts. The decoded video blocks are then stored in reference picture memory 142, which provides reference blocks for subsequent motion compensation and also produces decoded video for presentation on a display device (such as display device 32 of FIG. 1).

Figure 4A:
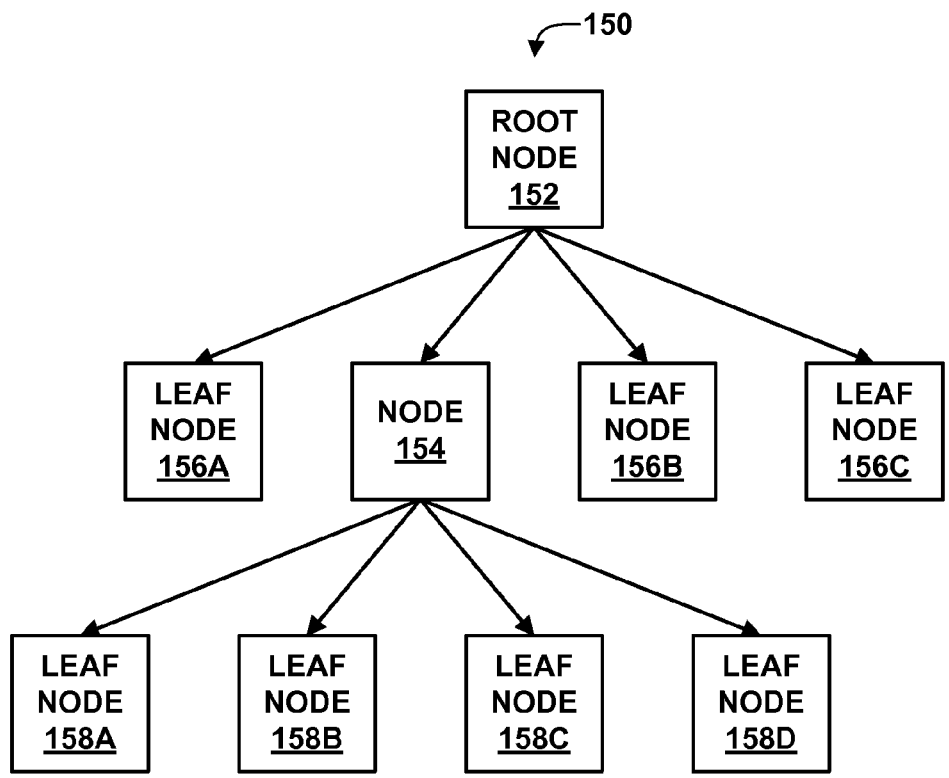
FIGS. 4A and 4B are conceptual diagrams illustrating an example quadtree and a corresponding largest coding unit (LCU).
Figure 4B:
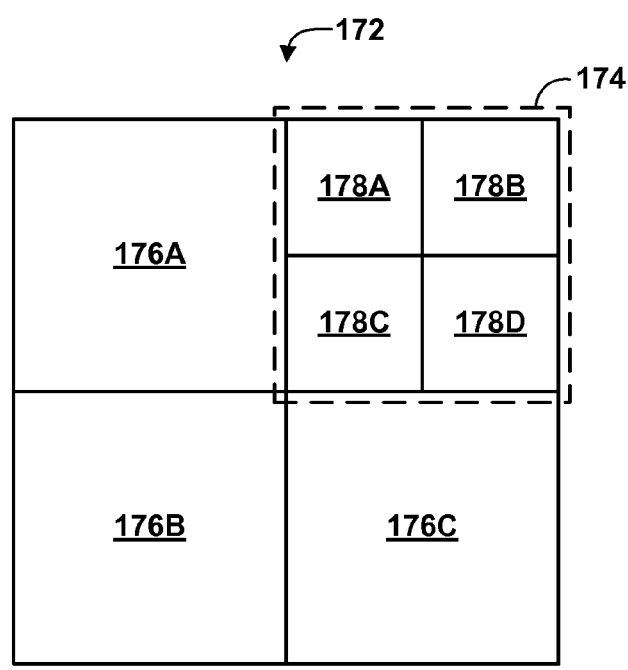

FIGS. 4A and 4B are conceptual diagrams illustrating an example quadtree 150 and a corresponding largest coding unit 172. FIG. 4A depicts an example quadtree 150, which includes nodes arranged in a hierarchical fashion. The quadtree 150 may be associated with, for example, a treeblock according to the proposed HEVC standard. Each node in a quadtree, such as quadtree 150, may be a leaf node with no children, or have four child nodes. In the example of FIG. 4A, quadtree 150 includes root node 152. Root node 152 has four child nodes, including leaf nodes 156A-156C (leaf nodes 156) and node 154. Because node 154 is not a leaf node, node 154 includes four child nodes, which in this example, are leaf nodes 158A-158D (leaf nodes 158).

Quadtree 150 may include data describing characteristics of a corresponding largest coding unit (LCU), such as LCU 172 in this example. For example, quadtree 150, by its structure, may describe splitting of the LCU into sub-CUs. Assume that LCU 172 has a size of 2N×2N. LCU 172, in this example, has four sub-CUs 176A-176C (sub-CUs 176) and 174, each of size N×N. Sub-CU 174 is further split into four sub-CUs 178A-178D (sub-CUs 178), each of size N/2×N/2. The structure of quadtree 150 corresponds to the splitting of LCU 172, in this example. That is, root node 152 corresponds to LCU 172, leaf nodes 156 correspond to sub-CUs 176, node 154 corresponds to sub-CU 174, and leaf nodes 158 correspond to sub-CUs 178.

Data for nodes of quadtree 150 may describe whether the CU corresponding to the node is split. If the CU is split, four additional nodes may be present in quadtree 150. In some examples, a node of a quadtree may be implemented similar to the following pseudocode:

```
quadtree_node {
    boolean split_flag(1);
    // signaling data
    if (split_flag) {
        quadtree_node child1;
        quadtree_node child2;
        quadtree_node child3;
        quadtree_node child4;
    }
}
```

The split_flag value may be a one-bit value representative of whether the CU corresponding to the current node is split. If the CU is not split, the split_flag value may be '0', while if the CU is split, the split_flag value may be '1'. With respect to the example of quadtree 150, an array of split flag values may be 101000000.

In some examples, each of sub-CUs 176 and sub-CUs 178 may be intra-prediction encoded using the same intra-prediction mode. Accordingly, video encoder 20 may provide an indication of the intra-prediction mode in root node 152.

While FIG. 4A illustrates an example of a CU quadtree, it should be understood that a similar quadtree may be applied to TUs of a leaf-node CU. That is, a leaf-node CU may include a TU quadtree that describes partitioning of TUs for the CU. A TU quadtree may generally resemble a CU quadtree, except that the TU quadtree may signal intra-prediction modes for TUs of the CU individually.

According to aspects of this disclosure, a video coder (such as video encoder 20 or video decoder 30) may apply a QP at a block level, such as the LCU level of LCU 172. For example, video encoder 20 may determine and signal a quantization scaling value for LCU 172. In this example, video encoder 20 may provide an indication of the quantization scaling value in a header of LCU 172, which is then applied to quantizer step size for quantizing transform coefficients associated with LCU 172. Video decoder 30 may receive the indication and perform the same quantization scaling as video encoder 20.

According to aspects of this disclosure, video encoder 20 may also predict a quantization scaling value. For example, video encoder 20 may identify a change between a quantization scaling value for a current LCU, such as LCU 172, and some reference LCU. Video encoder 20 may then signal the delta quantization scaling value for the current block in the bitstream. In one example, video encoder 20 may generate the delta quantization scaling value using a quantization scaling value for a previously coded LCU as a reference value. In another example, video encoder 20 may generate the delta quantization scaling value using a quantization scaling value identified for the slice to which a current LCU belongs as a reference value. Video decoder 30 may receive the delta quantization scaling value and determine the quantization scaling value in the same way. In some examples, video encoder 20 may provide an indication regarding where to retrieve the reference scaling value. In other examples, video encoder 20 and video decoder 30 may be configured to retrieve the reference scaling value from the same location.

According to other aspects of this disclosure, a video coder (such as video encoder 20 or video decoder 30) may identify quantization granularity at the largest coding unit (LCU) level. That is, a received LCU header associated with LCU 172 may contain one or more syntax elements specifying the QP granularity for one ore more blocks of LCU 172. The syntax elements may include an index that specifies the actual QP granularity, or may include a pointer to a predefined table of QP granularities.

While described with respect to LCU 172, it should be understood that in other examples, the quantizing techniques described with respect to FIGS. 4A and 4B may be performed at another level, such as the slice level described above.

Figure 5:
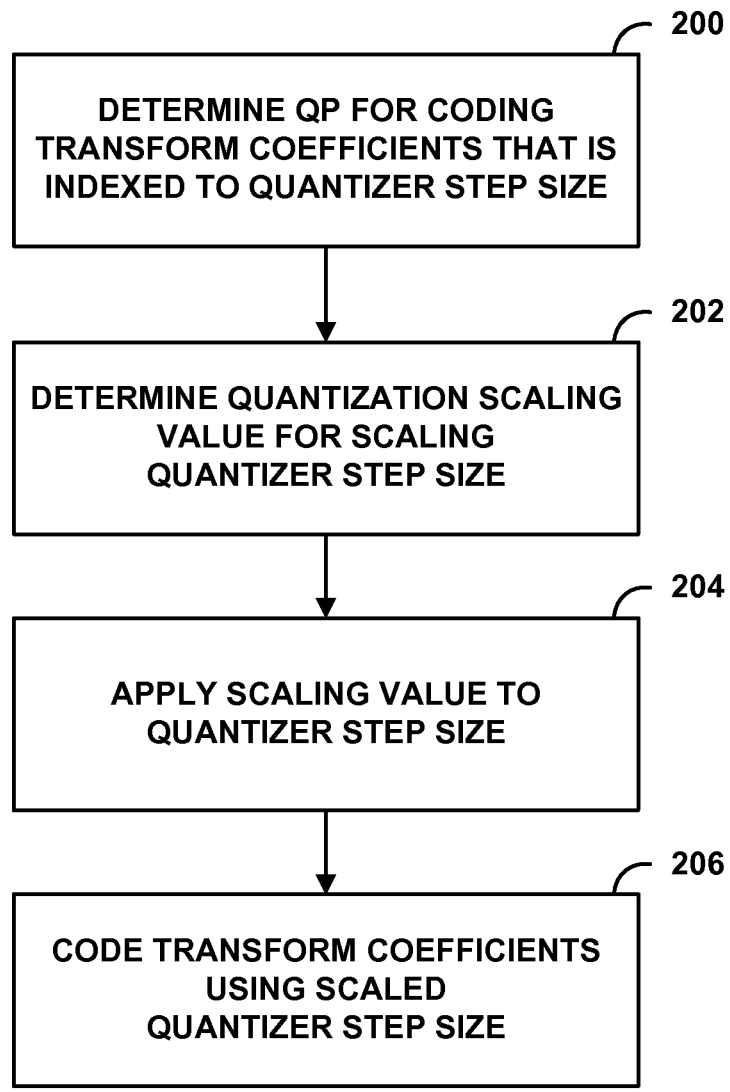
FIG. 5 is a flow diagram illustrating an example technique for quantizing video data.
Figure 6:
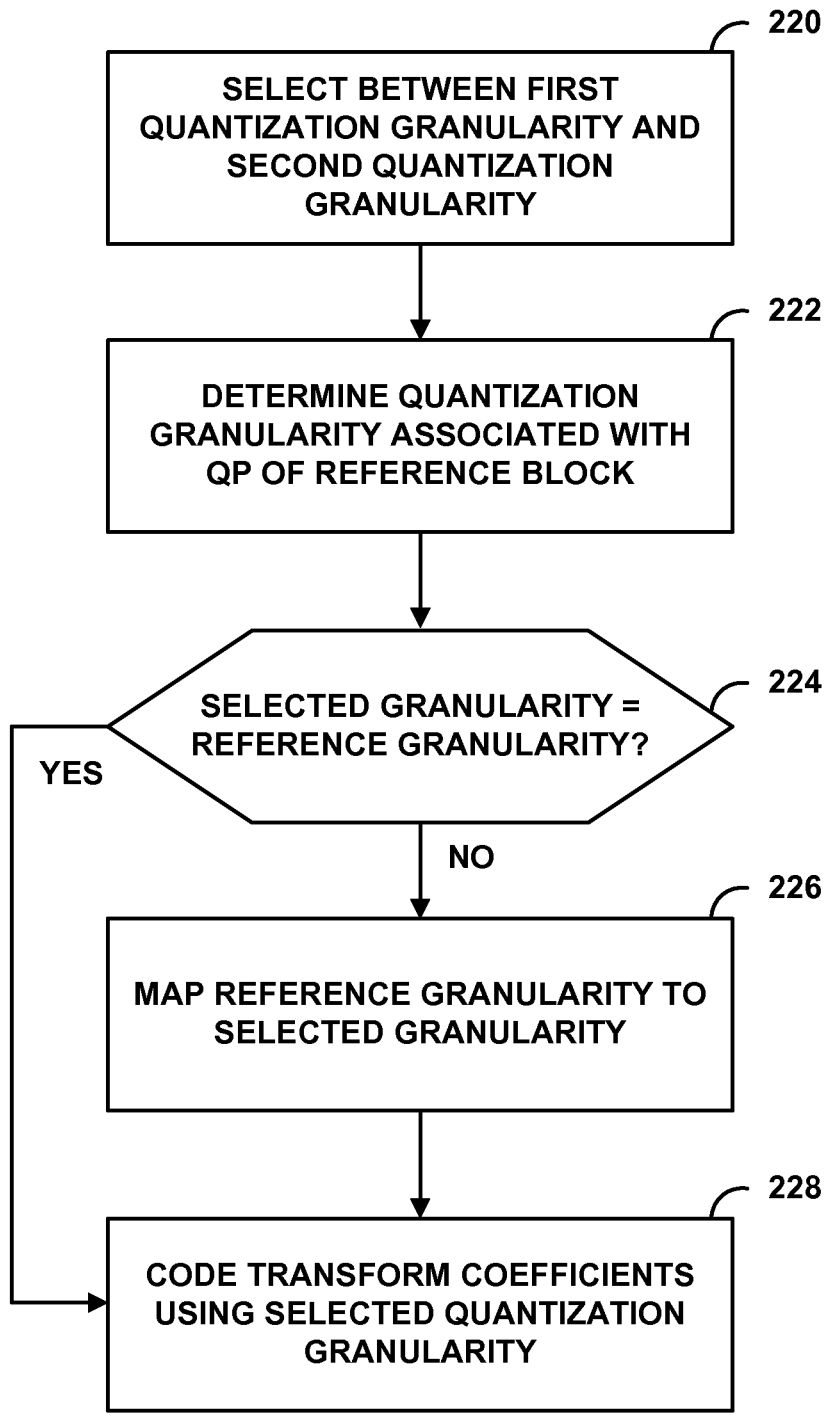
FIG. 6 is a flow diagram illustrating another example technique for quantizing video data.

While the techniques of FIGS. 5 and 6 are generally described as being performed by a video coder, it should be understood that, in some examples, the techniques of FIGS. 5 and 6 may be carried out by video encoder 20 (FIGS. 1 and 2) or video decoder 30 (FIGS. 1 and 3), described above. In other examples, the techniques of FIGS. 5 and 6 may be performed by a variety of other processors, processing units, hardware-based coding units such as encoder/decoders (CO-DECs), and the like.

FIG. 5 is a flow diagram illustrating techniques for performing quantization by a video coding device (video coder, such as video encoder 20 and/or video decoder 30). In the example of FIG. 5, the video coder may determine a QP for coding transform coefficients associated with a block of video data that is indexed to a particular quantizer step size (200). For example, as described above, the video coder may adjust an amount of quantization applied to the transform coefficients according to a predefined range of QPs that are indexed to quantizer step sizes.

Prior to applying the quantizer step size during quantization (or inverse quantization), the video coder may determine a quantization scaling value for scaling the quantizer step size (202). That is, a video encoder (such as video encoder 20) may determine a quantizer step size to achieve a certain bit rate. Alternatively, in some examples, a video decoder (such as video decoder 30) may determine a quantizer step size according to one or more received syntax elements (e.g., syntax elements in a slice header, LCU information, information with a CU or group of CUs, or the like). According to some aspects of this disclosure, a quantization scaling value may be determined based on a difference between a delta scaling value and a reference scaling value.

The video coder may then apply the scaling value to the quantizer step size (204). In this way, the video coder may scale the quantizer step size to a value that is between quantizer step sizes indexed to whole QP values. The video coder may code transform coefficients using the scaled quantizer step size (206).

For example, with respect to a video encoder (such as video encoder 20), the video encoder may receive the transform coefficients associated with the block. The video encoder may then apply the scaled quantizer step size during quantization of the transform coefficients. The video encoder may also provide an indication of the quantizer scaling value, such as in a slice header, with LCU information, with CU information, with a group of CUs, in a parameter set, or the like. In some examples, the video encoder may provide an indication of the quantizer scaling value using a delta quantizer scaling value.

With respect to a video decoder (such as video decoder 30), the video decoder may receive and entropy decode quantized transform coefficients associated with a block of video data. The video decoder may also receive an indication of a quantizer scaling value (or delta quantizer scaling value) for the block or slice to which the block belongs. The video decoder may code the transform coefficients by applying the scaled quantizer step size during inverse quantization of the transform coefficients.

The steps of the example shown in FIG. 5 need not necessarily be performed in the order shown in FIG. 5, and fewer, additional, or alternative steps may be performed.

FIG. 6 is a flow diagram illustrating techniques for performing quantization by a video coding device (video coder, such as video encoder 20 and/or video decoder 30). In the example of FIG. 6, the video coder may select between a first quantization granularity and a second, different quantization granularity (220). As noted above, quantization granularity, which may be referred to as QP granularity, may generally refer to an extent to which a predefined amount of quantization may be subdivided. For example, the video coder may quantize transform coefficients using a range of QPs that are indexed to quantizer step sizes. Accordingly, the QPs (and their associated quantizer step sizes) define the bounds of a total amount of quantization that may be applied to transform coefficients. In this example, quantization granularity may refer to the extent to which the total quantization is subdivided and indexed with QP values.

To select a quantization granularity, for example, a video encoder (such as video encoder 20) may select a quantization granularity that achieves a certain bit rate. For example, the video encoder may select the higher quantization granularity for areas of a picture that are relatively complex, or may select the lower quantization granularity for areas of the picture where less quantization control is needed. Alternatively, in some examples, a video decoder (such as video decoder 30) may determine a quantization granularity according to one or more received syntax elements (e.g., syntax elements in a slice header, LCU information, information with a CU, information with a group of CUs, or the like).

In some examples, the video coder may also determine the quantization granularity associated with a QP of a reference block (222). For example, in some instances the video coder may determine a delta QP. In such instances, quantization granularity of the QP associated with the reference block may not match the quantization granularity of the current block. Accordingly, the video coder may determine whether the selected quantization granularity (for coding the current block) matches the quantization granularity of the reference QP (224).

If the quantization granularities do not match (the NO branch of step 224), the video coder may map the quantization granularity of the reference QP to the selected quantization granularity (or vice versa) (226). In addition, in instances in which more than one reference QP is used, the video coder may map the quantization granularities of all reference QPs to the same quantization granularity. In one example, the video coder may maintain all QPs at a high quantization granularity. If a particular block used for QP prediction has the first quantization granularity, the video coder may convert the QP for the predictive block to the second quantization granularity using a predetermined mapping function. The video coder may then be able to perform QP prediction at the second quantization granularity. On the other hand, if the video coder maintains QPs at the first granularity, the video coder may use the predetermined mapping function to convert the QP for the predictive block the first quantization granularity. The video coder may then be able to perform QP prediction at the first QP granularity.

The video coder may then code transform coefficients using the selected granularity (228). If the quantization granularities do match (the YES branch of step 224), the video coder may not perform the mapping described above and may proceed directly to step 228. In any case, to code the transform coefficients, with respect to a video encoder (such as video encoder 20), the video encoder may receive transform coefficients associated with the block. The video encoder may then determine a QP for quantizing the transform coefficients having the selected quantization granularity and quantize the transform coefficients using the determined QP. Rather than signaling the actual QP used to quantize the transform coefficients, the video encoder may determine a delta QP between the actual QP and the reference QP (identified in step 222). The video encoder may then determine and signal a delta QP based on a difference between the reference QP and the actual QP used to quantize the transform coefficients. In addition, the video encoder may provide an indication of the quantization granularity (e.g., in a slice header, which LCU information, with CU information, with a group of CUs, or the like in an encoded bitstream).

With respect to a video decoder (such as video decoder 30), to code the transform coefficients the video decoder may receive and entropy decode quantized transform coefficients. The video decoder may determine and apply a QP having the selected quantization granularity for inverse quantizing the quantized transform coefficients to generate transform coefficients. In some examples, the video decoder may receive a delta QP for the block. In such examples, the video coder may determine the actual QP (having the selected granularity) based on a combination of the received delta QP and the reference QP. The video decoder may then inverse quantize the quantized transform coefficients using the determined actual QP.

While the example of FIG. 6 is described with respect to two quantization granularities, it should be understood that the techniques are more generally applicable to more than two quantization granularities (including quantization granularities other than 6 and 12). Moreover, the steps of the example shown in FIG. 6 need not necessarily be performed in the order shown in FIG. 6, and fewer, additional, or alternative steps may be performed. In examples in which adaptive quantization (using a delta QP) is not used, the mapping performed in steps 222-226 may not be required.

It should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit (e.g., such as quantization unit 54 (FIG. 2) or inverse quantization unit 136 (FIG. 3)) for purposes of clarity, it should be understood that the techniques of this disclosure may be performed by a combination of units or modules associated with a video coder.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method of coding video data, the method comprising:
determining, for a block of residual video data, a quantization parameter (QP) from a plurality of QPs for coding the residual video data, wherein each QP of the plurality of QPs is indexed to a predetermined quantizer step size, and wherein the predetermined quantizer step size is fixed;

coding, for the block of the residual video data, one or more syntax elements that indicate a value for a quantization scaling value that is separate from the predetermined quantizer step size for scaling the predetermined quantizer step size indexed to the determined QP;

applying the quantization scaling value to the predetermined quantizer step size to determine a scaled quantizer step size, and wherein:

applying the quantization scaling value to the predetermined quantizer step size causes the predetermined quantizer step size to increase to the scaled quantizer step size, wherein the scaled quantizer step size corresponds to less quantization than an amount of quantization associated with a next higher QP relative to the QP; or applying the quantization scaling value to the predetermined quantizer step size causes the predetermined quantize step size to decrease to the scaled quantizer step size, wherein the scaled quantizer step size corresponds to more quantization than an amount of quantization associated with a next lower QP relative to the QP; and de-quantizing one or more transform coefficients of the block of residual video data using the scaled quantizer step size.

2. The method of claim 1, wherein applying the quantization scaling value to the predetermined quantizer step size comprises applying the quantization scaling value such that the scaled quantizer step size is less than a second quantizer step size indexed to a second QP adjacent to the QP in a range of QPs.

3. The method of claim 1, further comprising generating the quantization scaling value based on a delta quantization scaling value, wherein the delta quantization scaling value comprises the difference between the value for the quantization scaling value and a reference quantization scaling value.

4. The method of claim 1, wherein coding the one or more syntax elements comprises decoding the one or more syntax elements from an encoded bitstream that includes the block of video data.

5. The method of claim 4, wherein decoding the one or more syntax elements that indicate the value for the quantization scaling value comprises decoding a slice header that includes the one or more syntax elements.

6. The method of claim 5, wherein decoding the one or more syntax elements comprises decoding a plurality of syntax elements, each syntax element of the plurality of syntax elements corresponding to a block type, such that applying the quantization scaling value comprises applying the quantization scaling value based on a block type of the block of residual data, the block type comprising at least one of an intra predicted block, an inter predicted block, a luma block, or a chroma block.

7. The method of claim 4, wherein decoding the one or more syntax elements that indicate the value for the quantization scaling value comprises decoding syntax associated with a largest coding unit that includes the block of video data.

8. The method of claim 7, wherein decoding the one or more syntax elements comprises decoding the one or more syntax elements based on a quantization scaling value of a previously coded largest coding unit.

9. The method of claim 1, further comprising encoding the one or more syntax elements and the one or more transform coefficients, and wherein encoding the one or more transform coefficients comprises quantizing the transform coefficient using the scaled quantizer step size.

10. The method of claim 9, further comprising encoding the one or more syntax elements that indicate the value for the quantization scaling value in a slice header of an encoded bitstream.

11. The method of claim 9, further comprising encoding the one or more syntax elements that indicate the value for the quantization scaling value with syntax for a largest coding unit that includes the block of video data.

12. The method of claim 1, further comprising:

selecting between at least a first quantization granularity and a second, different quantization granularity, wherein quantization granularity comprises an extent to which a predetermined amount of quantization for transform coefficient coding is subdivided; and coding one or more transform coefficients associated with the residual video data using the selected quantization granularity.

13. The method of claim 1, wherein applying the quantization scaling value to the predetermined quantizer step size comprises multiplying the predetermined quantizer step size by the quantization scaling value.

14. The method of claim 1, the method being executable on a wireless communication device, wherein the device comprises:

a memory configured to store the block of residual data;

a processor configured to execute instructions to process the block of residual data stored in said memory; and a receiver configured to receive the block of residual data.

15. The method of claim 14, wherein the wireless communication device is a cellular telephone and the block of residual data is received by the receiver and modulated according to a cellular communication standard.

16. An apparatus for coding video data, the apparatus comprising:

a memory configured to store residual video data; and one or more processors configured to:

determine, for a block of residual video data, a quantization parameter (QP) from a plurality of QPs for coding the residual video data, wherein each QP of the plurality of QPs is indexed to a predetermined quantizer step size, and wherein the predetermined quantizer step size is fixed;

code, for the block of the residual video data, one or more syntax elements that indicate a value for a quantization scaling value that is separate from the predetermined quantizer step size for scaling the predetermined quantizer step size indexed to the determined QP;

apply the quantization scaling value to the predetermined quantizer step size to determine a scaled quantizer step size, and wherein:

to apply the quantization scaling value to the predetermined quantizer step size, the one or more processors cause the predetermined quantizer step size to increase to the scaled quantizer step size, wherein the scaled quantizer step size corresponds to less quantization than an amount of quantization associated with a next higher QP relative to the QP; or to apply the quantization scaling value to the predetermined quantizer step size, the one or more processors cause the predetermined quantize step size to decrease to the scaled quantizer step size, wherein the scaled quantizer step size corresponds to more quantization than an amount of quantization associated with a next lower QP relative to the QP; and de-quantize one or more transform coefficients of the block of residual video data using the scaled quantizer step size.

17. The apparatus of claim 16, wherein to apply the quantization scaling value to the predetermined quantizer step size, the one or more processors are configured to apply the quantization scaling value such that the scaled quantizer step size is less than a quantizer step size indexed to a second QP adjacent to the QP in a range of QPs.

18. The apparatus of claim 16, wherein the one or more processors are further configured to generate the quantization scaling value based on a delta quantization scaling value, wherein the delta quantization scaling value comprises the difference between the value for the quantization scaling value and a reference quantization scaling value.

19. The apparatus of claim 16, wherein to code the one or more syntax elements, the one or more processors are configured to decode the one or more syntax elements from an encoded bitstream that includes the block of video data.

20. The apparatus of claim 19, wherein to decode the one or more syntax elements, the one or more processors are configured to decode a slice header that includes the one or more syntax elements.

21. The apparatus of claim 19, wherein to decode the one or more syntax elements that indicate the value for the quantization scaling value, the one or more processors are configured to decode a largest coding unit that includes the one or more syntax elements.

22. The device of claim 16, wherein the device is a wireless communication device, further comprising a receiver configured to receive the block of residual data.

23. The device of claim 22, wherein the wireless communication device is a cellular telephone and the block of residual data is received by the receiver and modulated according to a cellular communication standard.

24. A method of coding video data, the method comprising:

selecting between at least a first quantization granularity and a second, different quantization granularity, wherein quantization granularity comprises an extent to which a predetermined amount of quantization for transform coefficient coding is subdivided, wherein the predetermined amount of quantization comprises a range of quantization from a minimum amount of quantization to a maximum amount of quantization, wherein the first quantization granularity indexes a first number of quantization parameters (QPs) to a first quantization step size, and wherein the second quantization granularity indexes a second number of QPs that is larger than the first number of QPs to a second quantization step size;

determining an actual QP associated with the selected quantization granularity for one or more transform coefficients associated with residual video data based on a delta QP, the delta QP determined as a difference between the actual QP and, when the reference QP has a different quantization granularity than the actual QP, a reference QP mapped to the quantization granularity of the actual QP; and coding the one or more transform coefficients associated with the residual video data using the actual QP associated with the selected quantization granularity.

25. The method of claim 24, wherein the first number of QPs is 52 and the second number of QPs is 104.

26. The method of claim 24, further comprising determining the delta QP for the transform coefficients, wherein determining the delta QP comprises, when the reference QP has the different quantization granularity than the actual QP, mapping the quantization granularity of the reference QP to the quantization granularity of the actual QP and determining the difference between the actual QP and the mapped reference QP.

27. The method of claim 24, wherein coding the one or more transform coefficients comprises encoding the one or more transform coefficients, and wherein encoding the one or more transform coefficients comprises:

quantizing the one or more transform coefficients to generate one or more quantized transform coefficients using the determined actual QP; and generating a bitstream to include the one or more quantized transform coefficients, the delta QP, and an indication of the quantization granularity.

28. The method of claim 27, wherein generating the bitstream comprises including an indication of the quantization granularity in one of a slice header and syntax elements associated with a largest coded unit.

29. The method of claim 24, wherein coding the one or more transform coefficients comprises decoding the one or more transform coefficients, and wherein decoding the one or more transform coefficients comprises inverse quantizing the one or more transform coefficients to generate one or more transform coefficients using the actual QP.

30. The method of claim 29, wherein selecting between the at least first and second quantization granularities comprises decoding an indication of the at least first and second quantization granularities from one of a slice header and syntax elements associated with a largest coded unit.

31. An apparatus for coding video data, the apparatus comprising:

a memory configured to store one or more transform coefficients; and one or more processors configured to:

select between at least a first quantization granularity and a second, different quantization granularity, wherein quantization granularity comprises an extent to which a predetermined amount of quantization for transform coefficient coding is subdivided, wherein the predetermined amount of quantization comprises a range of quantization from a minimum amount of quantization to a maximum amount of quantization, wherein the first quantization granularity indexes a first number of quantization parameters (QPs) to a first quantization step size, and wherein the second quantization granularity indexes a second number of QPs that is larger than the first number of QPs to a second quantization step size;

determining an actual QP associated with the selected quantization granularity for the one or more transform coefficients based on a delta QP, the delta QP determined as a difference between the actual QP and, when the reference QP has a different quantization granularity than the actual QP, a reference QP mapped to the quantization granularity of the actual QP; and code the one or more transform coefficients associated with residual video data using the actual QP associated with the selected quantization granularity.

32. The apparatus of claim 31, wherein the first number of QPs is 52 and the second number of QPs is 104.

33. The apparatus of claim 31, wherein the one or more processors are further configured to determine the delta QP for the transform coefficients, wherein determining the delta QP comprises,
when the reference QP has a different quantization granularity than the actual QP, mapping the quantization granularity of the reference QP to the quantization granularity of the actual QP and determining the difference between the actual QP and the mapped reference QP.

34. The apparatus of claim 31, wherein to code the one or more transform coefficients, the one or more processors are configured to encode the one or more transform coefficients, and wherein encoding the one or more transform coefficients comprises:
quantizing the one or more transform coefficients to generate one or more quantized transform coefficients using the determined actual QP; and
generating a bitstream to include the one or more quantized transform coefficients, the delta QP, and an indication of the quantization granularity.

35. An apparatus for coding video data, the apparatus comprising:
means for determining, for a block of residual video data, a quantization parameter (QP) from a plurality of QPs for coding the residual video data, wherein each QP of the plurality of the QPs is indexed to a predetermined quantizer step size, and wherein the predetermined quantizer step size is fixed;
means for coding, for the block of the residual video data, one or more syntax elements that indicate a value for a quantization scaling value that is separate from the predetermined quantizer step size for scaling the predetermined quantizer step size indexed to the determined QP;
means for applying the quantization scaling value to the predetermined quantizer step size to determine a scaled quantizer step size, and wherein:
the means for applying the quantization scaling value to the predetermined quantizer step size causes the predetermined quantizer step size to increase to the scaled quantizer step size, wherein the scaled quantizer step size corresponds to less quantization than an amount of quantization associated with a next higher QP relative to the QP; or
the means for applying the quantization scaling value to the predetermined quantizer step size causes the predetermined quantize step size to decrease to the scaled quantizer step size, wherein the scaled quantizer step size corresponds to more quantization than an amount of quantization associated with a next lower QP relative to the QP; and
means for de-quantizing one or more transform coefficients of the block of residual video data using the scaled quantizer step size.

36. A non-transitory computer-readable storage medium having instructions stored thereon that, when executed, cause one or more processors to:
determine, for a block of residual video data, a quantization parameter (QP) from a plurality of QPs for coding the residual video data, wherein each QP of the plurality of QPs is indexed to a predetermined quantizer step size, and wherein the predetermined quantizer step size is fixed;
code, for the block of the residual video data, one or more syntax elements that indicate a value for a quantization scaling value that is separate from the predetermined quantizer step size for scaling the predetermined quantizer step size indexed to the determined QP;
apply the quantization scaling value to the predetermined quantizer step size to determine a scaled quantizer step size, and wherein:
to apply the quantization scaling value to the predetermined quantizer step size, the instructions cause the one or more processors to cause the predetermined quantizer step size to increase to the scaled quantizer step size, wherein the scaled quantizer step size corresponds to less quantization than an amount of quantization associated with a next higher QP relative to the OP; or
to apply the quantization scaling value to the predetermined quantizer step size, the instructions cause the one or more processors to cause the predetermined quantize step size to decrease to the scaled quantizer step size, wherein the scaled quantizer step size corresponds to more quantization than an amount of quantization associated with a next lower QP relative to the QP; and
de-quantize one or more transform coefficients of the block of residual video data using the scaled quantizer step size.

37. An apparatus for coding video data, the apparatus comprising:
means for selecting between at least a first quantization granularity and a second, different quantization granularity, wherein quantization granularity comprises an extent to which a predetermined amount of quantization for transform coefficient coding is subdivided, wherein the predetermined amount of quantization comprises a range of quantization from a minimum amount of quantization to a maximum amount of quantization, wherein the first quantization granularity indexes a first number of quantization parameters (QPs) to a first quantization step size, and wherein the second quantization granularity indexes a second number of QPs that is larger than the first number of QPs to a second quantization step size;
means for determining an actual QP associated with the selected quantization granularity for the one or more transform coefficients based on a delta QP, the delta QP determined as a difference between the actual QP and, when the reference QP has a different quantization granularity than the actual QP, a reference QP mapped to the quantization granularity of the actual QP; and
means for coding one or more transform coefficients associated with residual video data using the actual QP associated with the selected quantization granularity.

38. A non-transitory computer-readable storage medium having instructions stored thereon that, when executed, cause one or more processors to:
select between at least a first quantization granularity and a second, different quantization granularity, wherein quantization granularity comprises an extent to which a predetermined amount of quantization for transform coefficient coding is subdivided, wherein the predetermined amount of quantization comprises a range of quantization from a minimum amount of quantization to a maximum amount of quantization, wherein the first quantization granularity indexes a first number of quantization parameters (QPs) to a first quantization step size, and wherein the second quantization granularity indexes a second number of QPs that is larger than the first number of QPs to a second quantization step size;

determining an actual QP associated with the selected quantization granularity for the one or more transform coefficients based on a delta QP, the delta QP determined as a difference between the actual QP and, when the reference QP has a different quantization granularity than the actual QP, a reference QP mapped to the quantization granularity of the actual QP; and code one or more transform coefficients associated with residual video data using the actual QP associated with the selected quantization granularity.

* * * * *